United States Patent
Sheth et al.

(10) Patent No.: US 7,782,778 B2
(45) Date of Patent: Aug. 24, 2010

(54) APPARATUS AND METHOD FOR FIBRE CHANNEL DISTANCE EXTENSION EMBEDDED WITHIN AN OPTICAL TRANSPORT SYSTEM

(76) Inventors: Samir Satish Sheth, 4520 Turnberry Ct., Plano, TX (US) 75024; Brian Royal, 6317 Glenmoor Dr., Garland, TX (US) 75043; Richard Thomas Hughey, 6891 Avalon Ave., Dallas, TX (US) 75214; Jeffrey Lloyd Cox, 280 Paddock Trail, Fairview, TX (US) 75069-1532; Tom Moore, 4517 Myerwood La., Dallas, TX (US) 75244; Kelly Hawkins, 1515 Rio Grande, #1615, Plano, TX (US) 75075

( * ) Notice: Subject to any disclaimer, the term of this patent is extended or adjusted under 35 U.S.C. 154(b) by 673 days.

(21) Appl. No.: 11/006,939

(22) Filed: Dec. 8, 2004

(65) Prior Publication Data

US 2005/0163168 A1    Jul. 28, 2005

Related U.S. Application Data

(63) Continuation-in-part of application No. 10/746,841, filed on Dec. 24, 2003, now Pat. No. 7,656,905.

(60) Provisional application No. 60/436,401, filed on Dec. 24, 2002, provisional application No. 60/608,198, filed on Sep. 8, 2004.

(51) Int. Cl.
*G01R 31/08* (2006.01)
*H04L 12/28* (2006.01)

(52) U.S. Cl. .................. 370/235; 370/410; 370/412

(58) Field of Classification Search ............... 370/400, 370/401, 410, 412, 468, 470, 472, 473, 528, 370/395.5, 535, 538, 537, 230, 231, 232, 370/233, 234, 235, 413, 238, 395.1; 709/225, 709/226, 228
See application file for complete search history.

(56) References Cited

U.S. PATENT DOCUMENTS

| | | | |
|---|---|---|---|
| 4,229,831 A | 10/1980 | Lacher | |
| 4,258,434 A | 3/1981 | Glowinski et al. | |
| 4,535,459 A | 8/1985 | Hogge, Jr. | |

(Continued)

FOREIGN PATENT DOCUMENTS

JP    01115230    5/1989

(Continued)

OTHER PUBLICATIONS

DeCusatis, C., "Dense wavelength division multiplexing for Parallel Sysplex and metropolitan/storage area networks," *Optical Networks Magazine*, SPIE, Bellingham, WA, US, vol. 2, No. 1, Jan. 2001, pp. 69-80, XP001065802.

(Continued)

*Primary Examiner*—Hanh Nguyen
(74) *Attorney, Agent, or Firm*—Woodcock Washburn LLP

(57) ABSTRACT

This invention provides an apparatus and method to aggregate individual fiber channel data streams in their native mode and to extend connectivity of fiber channel storage area networks across wide geographical distances over a high-speed data channel with forward error correction.

97 Claims, 9 Drawing Sheets

U.S. PATENT DOCUMENTS

| | | | |
|---|---|---|---|
| 4,636,859 A | 1/1987 | Vernhet et al. | |
| 4,710,022 A | 12/1987 | Soeda et al. | |
| 5,189,410 A | 2/1993 | Kosugi et al. | 340/825.2 |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,452,124 A | 9/1995 | Baker | |
| 5,455,703 A | 10/1995 | Duncan et al. | |
| 5,493,566 A * | 2/1996 | Ljungberg et al. | 370/231 |
| 5,559,625 A | 9/1996 | Smith et al. | |
| 5,608,562 A | 3/1997 | Delavaux et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,742,416 A | 4/1998 | Mizrahi | |
| 5,778,116 A | 7/1998 | Tomich | |
| 5,790,285 A | 8/1998 | Mock | |
| 5,812,290 A | 9/1998 | Maeno et al. | |
| 5,812,306 A | 9/1998 | Mizrahi | |
| 5,877,881 A | 3/1999 | Miyauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikawa | |
| 5,940,209 A | 8/1999 | Nguyen | |
| 5,940,456 A | 8/1999 | Chen et al. | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,043,914 A | 3/2000 | Cook et al. | |
| 6,075,634 A | 6/2000 | Casper et al. | |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,288,811 B1 | 9/2001 | Jiang et al. | |
| 6,288,813 B1 | 9/2001 | Kirkpatrick et al. | |
| 6,307,656 B2 | 10/2001 | Terahara | |
| 6,317,231 B1 | 11/2001 | Al-Salameh et al. | |
| 6,317,255 B1 | 11/2001 | Fatehi et al. | |
| 6,320,687 B1 | 11/2001 | Ishikawa | |
| 6,323,950 B1 | 11/2001 | Kim et al. | |
| 6,327,060 B1 | 12/2001 | Otani et al. | |
| 6,356,384 B1 | 3/2002 | Islam | |
| 6,359,729 B1 | 3/2002 | Amoruso | |
| 6,370,300 B1 | 4/2002 | Eggleton et al. | |
| 6,388,801 B1 | 5/2002 | Sugaya et al. | |
| 6,396,853 B1 | 5/2002 | Humphrey et al. | |
| 6,417,961 B1 | 7/2002 | Sun et al. | |
| 6,519,082 B2 | 2/2003 | Ghera et al. | |
| 6,657,962 B1 * | 12/2003 | Barri et al. | 370/235 |
| 6,671,256 B1 * | 12/2003 | Xiong et al. | 370/230 |
| 6,704,882 B2 | 3/2004 | Zabinski et al. | |
| 6,721,268 B1 | 4/2004 | Ohira et al. | 370/223 |
| 6,721,295 B1 | 4/2004 | Brown | |
| 6,728,492 B1 | 4/2004 | Baroncelli | 398/154 |
| 6,744,787 B1 | 6/2004 | Schatz et al. | 370/506 |
| 6,751,743 B1 | 6/2004 | Theodoras et al. | 713/400 |
| 6,757,468 B2 | 6/2004 | Bickham et al. | |
| 6,859,437 B2 | 2/2005 | Miller et al. | |
| 6,865,311 B2 | 3/2005 | Li et al. | |
| 6,943,935 B2 | 9/2005 | Bickham et al. | |
| 7,016,344 B1 | 3/2006 | Martin | 370/359 |
| 7,042,908 B1 | 5/2006 | Mayer | 370/503 |
| 7,072,348 B2 * | 7/2006 | Frank | 370/412 |
| 7,079,528 B2 * | 7/2006 | Ziegler et al. | 370/352 |
| 7,164,698 B1 * | 1/2007 | Krishnamurthi et al. | 370/541 |
| 7,215,637 B1 * | 5/2007 | Ferguson et al. | 370/230.1 |
| 7,257,120 B2 * | 8/2007 | Saunders et al. | 370/395.21 |
| 7,301,954 B1 * | 11/2007 | Chu | 370/412 |
| 7,304,952 B2 * | 12/2007 | Scholten | 370/235 |
| 7,324,548 B2 | 1/2008 | Natarajan et al. | |
| 7,333,438 B1 * | 2/2008 | Rabie et al. | 370/242 |
| 7,346,058 B1 * | 3/2008 | Natarajan et al. | 370/392 |
| 7,369,498 B1 * | 5/2008 | Ma et al. | 370/235 |
| 7,372,812 B2 | 5/2008 | Fujiyoshi | |
| 7,443,794 B2 | 10/2008 | George et al. | |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2001/0053161 A1 | 12/2001 | Tomizawa et al. | |
| 2002/0012152 A1 | 1/2002 | Agazzi et al. | |
| 2002/0015220 A1 | 2/2002 | Papernyl et al. | |
| 2002/0027929 A1 | 3/2002 | Eaves | |
| 2002/0034197 A1 | 3/2002 | Tornetta et al. | |
| 2002/0037018 A1 | 3/2002 | Lentine et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2002/0110157 A1 | 8/2002 | Jorgenson et al. | |
| 2002/0138611 A1 | 9/2002 | Roe et al. | 709/224 |
| 2003/0016705 A1 | 1/2003 | Bellatao et al. | |
| 2003/0026533 A1 | 2/2003 | Danziger et al. | |
| 2003/0055998 A1 | 3/2003 | Saha et al. | |
| 2003/0093567 A1 | 5/2003 | Lolayekar et al. | 709/246 |
| 2003/0097600 A1 | 5/2003 | Wong | 713/400 |
| 2003/0112833 A1 | 6/2003 | Kamiya | 370/535 |
| 2003/0235215 A1 | 12/2003 | Carrel et al. | |
| 2004/0042067 A1 | 3/2004 | Eiselt | |
| 2004/0062277 A1 | 4/2004 | Flavin et al. | |
| 2004/0208607 A1 | 10/2004 | Eiselt et al. | |
| 2004/0246977 A1 | 12/2004 | Dove et al. | 370/395.61 |
| 2007/0031153 A1 | 2/2007 | Aronson et al. | |

FOREIGN PATENT DOCUMENTS

| | | |
|---|---|---|
| JP | 02238736 | 9/1990 |

OTHER PUBLICATIONS

Nujeerallee, S. et al., "Storage Area Networking," *British Telecommunications Engineering*, vol. 3, Part 1, Jan. 2004, pp. 48-58, XP001227050.

Mohr, U., "Optical storage networking," *Proceedings of the SPIE*, Bellingham, WA, US, vol. 4534, 2001, pp. 190-198, XP009060022.

United States Patent and Trademark Office: Non-Final Office Action dated Aug. 20, 2007, U.S. Appl. No. 10/402,314, 8 pages.

United States Patent and Trademark Office: Non-Final Office Action dated Oct. 4, 2007, U.S. Appl. No. 10/402,314, 9 pages.

United States Patent and Trademark Office: Final Office Action dated Apr. 16, 2008, U.S. Appl. No. 10/402,314, 10 pages.

"Microsoft Compter Dictionary, Fifth Edition," Microsoft Press, 2002, http://proquest.safaribooksonline.com/0735614954/pref01, 1-2.

European Application No. EP09075216.3, Search Report dated Jul. 16, 2009.

PCT Application No. PCT/US2005/032009: International Search Report, dated Feb. 1, 2006.

\* cited by examiner

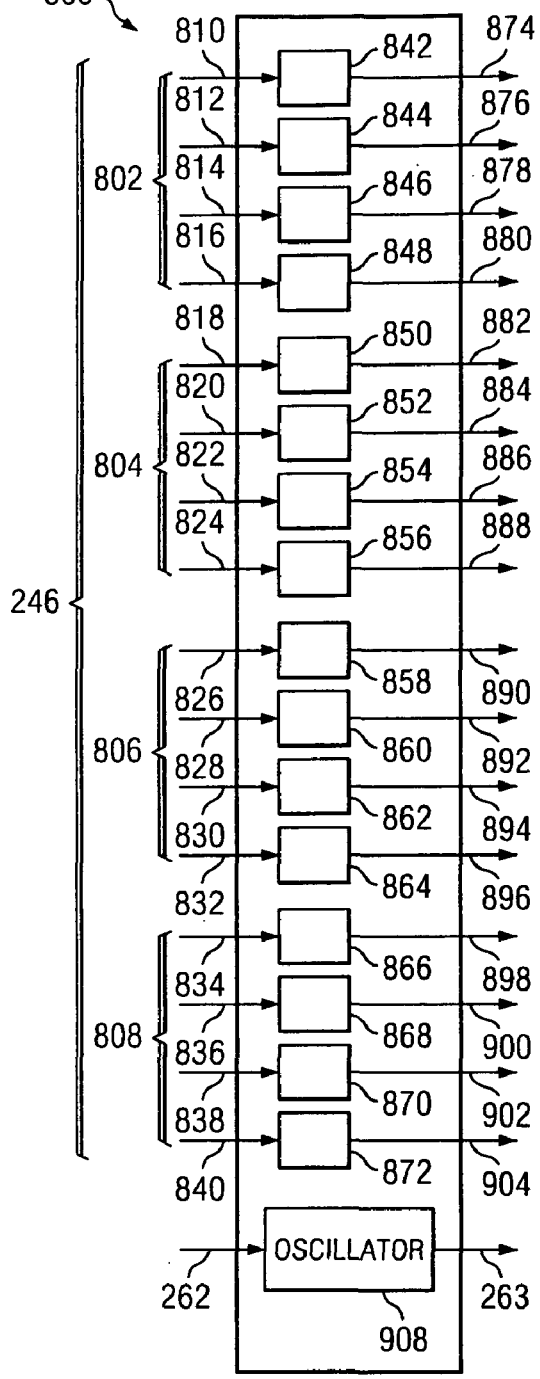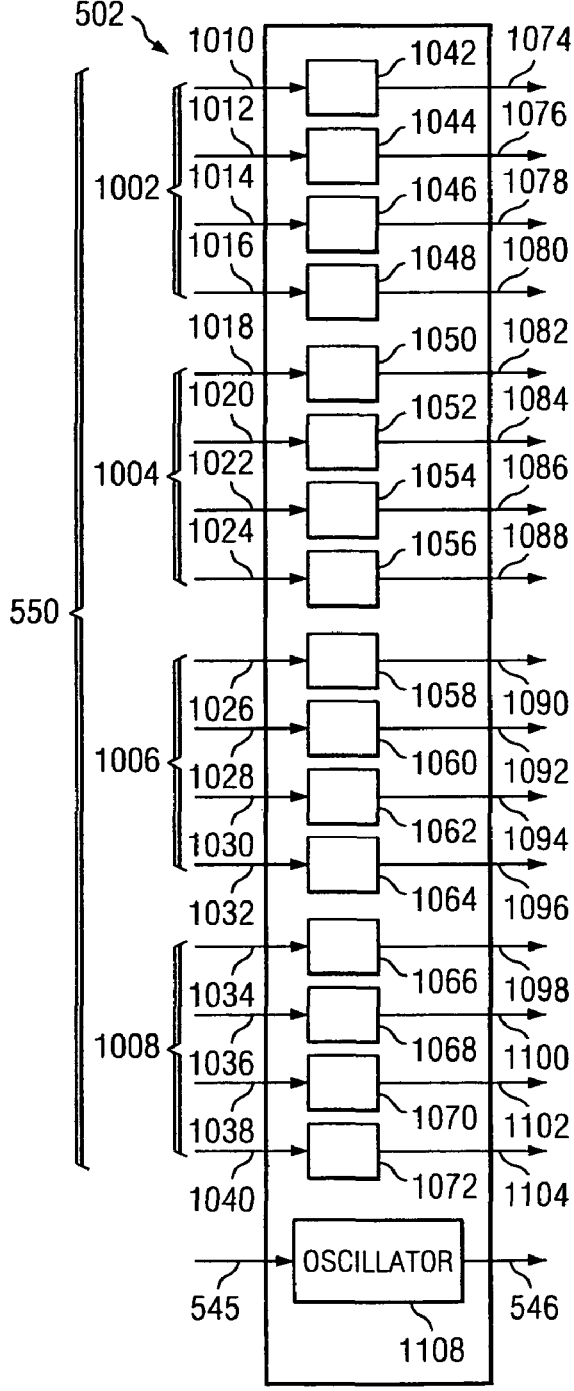

APPARATUS AND METHOD FOR FIBRE CHANNEL DISTANCE EXTENSION EMBEDDED WITHIN AN OPTICAL TRANSPORT SYSTEM

CROSS-REFERENCE TO RELATED APPLICATIONS

This application is a continuation-in-part of U.S. patent application Ser. No. 10/746,841, filed Dec. 24,2003 now U.S. Pat. No. 7,656,905, which claims the benefit of U.S. Provisional Application Ser. No. 60/436,401, filed Dec. 24, 2002, the disclosure of which is incorporated herein by reference in its entirety. This application also claims the benefit of U.S. Provisional Application Ser. No. 60/608,198, filed Sep. 8, 2004, the disclosure of which is incorporated herein by reference in its entirety. This application is related by subject matter to U.S. patent application Ser. No. 10/402,314, filed Mar. 28, 2003.

FIELD OF THE INVENTION

This invention relates to a computer system embedded within optical transport equipment that provides aggregation of disparate fibre channel data streams in their native mode and a method to extend connectivity of fibre channel storage area networks across wide geographical distances over a high-speed data channel with forward error correction.

BACKGROUND OF THE INVENTION

Fibre Channel is the dominant protocol today for connecting Storage Area Networks (SAN). There are other protocols such as FICON that have the same physical layer interface as Fibre Channel and can be transported using the methods described here. The Fibre Channel protocol enables transmission of high-speed signals across geographically dispersed computers and storage systems.

Traditionally, file servers with large external disks or disk farms using the SCSI standard have been used to support applications requiring large amounts of data storage. As applications increased, the storage system capacities and bandwidth (data transfer speed) requirements increased. The SCSI standard limitations made scaling difficult. The servers could only access data on devices directly attached to them. Failure of the server or SCSI hardware could cause an access failure. Also, SCSI supports only a finite number of devices and is therefore not scalable. The parallel structure of SCSI results in distance limitations that require equipment to be co-located.

Storage Area Networks (SAN) were implemented to overcome the limitations of the SCSI architecture. The SAN is a network between the servers and the storage devices. A SAN allows multiple servers to access any storage device. This increases fault tolerance and overcomes the distance limitation since the server and storage do not need to be co-located. The dominant networking technology for implementing SAN is Fibre Channel.

Fibre Channel technology [ANSI X3T11] was designed to enable high-speed data transfer between computer systems and storage devices. It supports common transport protocols including Internet Protocol and SCSI. It supports high-speed data transfer at standard rates of 1 Gbps, 2 Gbps, 4 Gbps, 8 Gbps, and 10 Gbps. It also supports communications across extended distances enabling corporations to have off-site storage thus enabling applications like disaster recovery and business continuity.

Fibre Channel data is comprised of frames that are concatenated into sequences to enable block transfers. The frame size may vary from 36 B to 2 KB. An exchange can consist of multiple sequences permitting large data transfers. As much as a 128 MB can be transported with a single command. The maximum amount of data that can be in flight across the link is dependent on the buffer credits. The buffer credits define the number of frames that are available to store the data in the event of any blockage along the data link. If the receiving equipment throttles data flow, the buffer must store the data that is in flight while the flow control mechanism provides backpressure to stop the traffic. Therefore, the amount of buffering needed is in excess of the round trip time of the communication system.

The amount of distance extension possible is a function of the amount of buffer memory that can be accommodated within the optical transport system. The buffer memory amount accommodated is a function of the size, power consumption, and density. High-speed memory is required so that it can operate at the bandwidth of the system. It must occupy small physical space so that it can be embedded in the transport equipment. The power consumption must also be within the constraints of the system. Thus, the amount of memory that can be accommodated within the physical constraints of the system defines the geographical distance extension possible.

Usually, SAN are connected to each other via fibre channel switches that have limited distance capability. Most fibre channel switches have limited buffer credits and limit SAN distance to 100 km. The Fibre Channel standard itself has a limitation of 250 km. Most equipment falls within the 250 km and is nominally capable of 100 km distances. Furthermore, the switches are optimized to communicate with themselves often running proprietary traffic. Therefore, a data transparent SAN extension method is often desired for interoperability with other equipment.

Embedding the distance extension within the optical transport system reduces overall cost, increases security, improves reliability, and results in increased throughput. Traditionally, the distance extension has been over a public network over Ethernet or SONET. This method results in decreased performance, reduced security, and increased costs. Accumulation of bit errors can degrade the throughput of the network. Connection through public networks increases vulnerability to attacks or increases costs since encryption devices are needed to provide secure communications.

Nonzero packet loss rates can also severely impact the throughput of FC/FICON transport. Public IP-based networks and even SONET private lines can introduce an error rate that forces significant end-to-end retransmissions for lost data. As distance between data centers increases, overall throughput and synchronization decreases from the effect of retransmissions at the FC/FICON upper-layer protocols (ULPs).

Fibre Channel-over-IP (FCIP) solutions that use shared switched or routed networks also suffer from increased latency from intermediate routing and switching sites. The forced TCP layer retransmissions due to packet loss also require significant bandwidth over allocation due to the drastic reduction in effective throughput. The security issues in public IP-based networks also require additional security measures that are not required for dedicated private networks. Enterprises thus resort to expenditures for additional encryption gear for their FCIP traffic. The use of many disparate boxes to provide the storage extension function and security result in an overall increase in cost, physical space required, and power consumption.

Traditional FC-over-SONET extension utilizes channel extenders or SAN extension gateways that access a traditional carrier network through a SONET access link. The end-to-end SONET connection traverses multiple SONET links across metro carrier and inter-exchange carrier (IXC) networks. Each SONET link is prone to a certain bit error rate (BER), without any error correction scheme such as Forward Error Correction (FEC) employed. Furthermore, the BER of the end-to-end SONET connection accumulates the bit errors across multiple links.

All of these considerations indicate a need for the fiber channel distance extension solution to be a part of the optical transport system. The solution described provides the security of a private network for institutions that transport financial and other critical data. Bypassing traditional public networks also improves communications reliability and results in increased throughput. This architecture also eliminates the need for additional equipment for SONET/Ethernet conversion and data encryption/decryption. This reduces the overall cost for applications such as disaster recovery and business continuity.

The equipment described incorporates the fibre channel extension function within the optical transport system using high-speed memory and proprietary flow control. The QDR SRAM memory used in this application provides the high density, low power consumption, and speed required to buffer the data and provide the distance extension. The flow control method improves upon fibre channel flow control and enables efficient use of memory for all packet sizes without loss of throughput. The concept of embedding the Fibre Channel data within the transport equipment provides the security of a private network. Use of forward error correction (FEC) to connect SAN improves the overall reliability of the link and results in increased throughput.

Due to the large sizes of modern databases, it is also desirable to have a plurality of high-speed data channels on the same fiber to provide scalable bandwidth. The capacity of modern storage systems is increasing beyond 500 Terabytes. The databases may carry financial and other data. More than 10 percent of the data can change over the course of a business day. If 50 Terabytes (400 Terabits) of data changes over 8 hours, 14 Gbps of bandwidth is required. This assumes that the data is changing at a constant rate. However, during the course of a business day, the data changes may occur in bursts so the peak data rate is much higher. Therefore, the network must be designed for the peak data rate to accommodate bursts of traffic. Criteria for peak to average vary depending on the traffic type. The average to peak ration may vary from 12.5% average to peak to 50%. In this example, 1.4 wavelengths required at the constant rate may increase to 2.8 (50%) or 9.2 (12.5%). As the storage capacity increases due to new higher capacity systems entering the market place or addition of parallel disk systems, the bandwidth requirement will increase accordingly. As higher data rate fiber channel interfaces are developed, the transport system must also support these new standards. Thus, a fiber channel distance extension solution with flexible interfaces and scalable capacity is required.

The apparatus and method shown enables fibre channel distance extension beyond 6000 km. High-density, low power consumption memory technology is embedded in each channel of the optical transport system to provide a large buffer for fibre channel data and thus extend the distance of SAN. A non-intrusive fibre channel extension method is used that provides data transparency without terminating the fibre channel traffic. Furthermore, the transport equipment is transparent to the terminating SAN equipment in that no Fibre Channel LOGIN is required into the transport equipment. In essence, the end devices are talking to each other. The distance extension is accomplished with fibre channel in its native mode without conversion to SONET or IP. Flexible fibre channel aggregation and extension architecture is used to allow flexible interfaces and scalable bandwidth. This enables aggregation of multiple low speed fiber channel interfaces to a single high-speed data channel.

Methods for sending data signals are taught in U.S. Pat. No. 6,151,334 to Kim, et al, United States Patent Publication No. 2002/0080809 to Nicholson, et al, United States Patent Publication No. 2002/0075903 to Hind and U.S. Pat. No. 6,396,853 to Humphrey et al.

SUMMARY OF THE INVENTION

This invention provides an apparatus and method to aggregate individual fibre channel data streams in their native mode and to extend connectivity of fibre channel storage area networks across wide geographical distances over a high-speed data channel with forward error correction. Data aggregation is accomplished by mapping the individual clock domains of fibre channel data streams to a single clock domain as shown in Table 1. The data streams may be at different data rates and with different encoding as shown. The distance extension is accomplished via implementation of external flow control per the FC standard at the Ingress (sending terminal) and Egress (receiving terminal) interface; and a proprietary internal flow control and credit extension method that incorporates sufficient buffer memory in the system to maximize the throughput of the extended link without data loss.

The process by which individual fibre channel data streams at various data rates are aggregated to a single high-speed data stream is shown below. Table 1 shows the aggregation of up to eight Gigabit Fiber Channel (GFC) data streams; four 2 GFC data streams; two 4 Gigabit Fibre Channel data streams; one 10 GFC data stream; or one 8 GFC data stream over a nominal 10.5 Gbps (Gigabits per second) optical transport link. Columns 1, 2 and 3 of Table 1 define the input data format. In the preferred embodiment, four Gigabit Fibre Channels or four 2 Gigabit Fibre Channel data streams are aggregated as shown in the first 2 rows of Table 1. In the preferred embodiment, the individual ports support both the 1 GFC and 2 GFC implementations that can be selected depending on the SAN interface requirements. Alternate embodiments, can provide 4 GFC, 8 GFC, and 10 GFC connectivity.

| Data Type | Data Rate (Gbps) | Encoding | Max Channels | Total (Gbps) | FEC Rate (Gbps) | Line Rate (Gbps) |
|---|---|---|---|---|---|---|
| GFC | 1.0625 | 10 b/8 b | 4/8 | 4.25/8.5 | 9.953 | 12.44 |
| 2 GFC | 2.125 | 10 b/8 b | 4 | 6.4 | 9.953 | 12.44 |
| 4 GFC | 4.25 | 10 b/8 b | 2 | 8.5 | 9.953 | 12.44 |
| 8 GFC | 8.5 | 10 b/8 b | 1 | 8.5 | 9.953 | 12.44 |
| 10 GFC | 10.5188 | 66 b/64 b | 1 | 10.5188 | 10.523 | 13.154 |

In the present invention, multiple packet-based data streams (column 4) are aggregated onto an independent clock source (column 6: 16 bits ×622.08 MHz=9.953 Gbps) through the "stuffing" of Idles and Status bits. The independent clock is selected such that the output data rate (column 6) is greater than the composite input data rate (column 5) of all the individual data streams. The independent clock prevents buffer overflow and provides an opportunity to embed Status information into the data.

In the preferred embodiment, four GFC or four 2 GFC data streams are aggregated into the 9.953 Gbps data link into the FEC device. After FEC, the aggregate data rate is 12.44 Gbps into the transport system.

In an alternate embodiment, two 4 GFC data streams or one 8 GFC data stream are aggregated to a single 10 G data link as shown in rows 3 and 4 of Table 1.

In an alternate embodiment (row 4 of Table 1 [10 GFC]), a single 10 GFC data stream at an input data rate 10.51875 Gbps. 10 GFC is different from 1 GFC and 2 GFC in that it uses a 64 b/66 b encoding on top of its 10.2 Gbps raw data rate which results in a much higher 10.51875 Gbps aggregate data rate. This data rate is increased by 400 ppm to enable embedding of status information in the data stream. Therefore, the data rate into the FEC is 10.523 Gbps.

The resulting signal is encapsulated with forward error correction (FEC) at the transport interface, serialized, and modulated across the transport system. The FEC provides for correction of errors caused due to data impairments in the transport system. In the present embodiment, the FEC signal is nominally 12.44 Gbps for the GFC/2 GFC/4 GFC signals. However, since the 10 GFC signal is at a much higher data rate, the FEC signal increases to 13.154 Gbps. The line rates after FEC may be decreased using alternate FEC devices which employ different overheads and coding gains.

The FEC also provides a reciprocal 16-bit SFI-4 interface that allows mapping of individual data streams to individual bits of the FEC interface. For example, the GFC data stream arrives as 10-bit wide data at 106.25 MHz or 1.0625 Gbps at single data rate or 2.125 Gbps at double data rate (data transitions between both edges of the clock). The FEC has a 16-bit interface at a clock rate of 622.08 MHz to accommodate a data rate of 9.953 Gbps. Therefore; each GFC data stream may be mapped to 8 (GFC) or 4 bits (2 GFC) of the FEC [# bits=(FEC data rate/GBE data rate)×# bits]. Therefore, up to 8 data streams may be mapped to the FEC. The encoded data arrives at the same two bit positions at the far end of the network since the interface is reciprocal. This method enables transmission of data in its native format without encoding channel ID or other wrapper.

The sending (ingress block) and receiving terminals (egress block) of the transport system work cohesively using both internal and external flow control mechanisms to communicate fiber channel data over extended distances without loss of data. The near-end FC port controls data flow into the terminal by providing a flow control signal to indicate when it is ready to receive packets. Standard fibre channel (FC) flow control is used at this external interface. The received data frames from the near-end client are sent to the far-end FC port where they are buffered in high-density memory and eventually sent to the far-end client. The far-end FC port sends data frames to the far-end client per the Egress (far-end) flow control mechanism per the fibre standard. The far-end FC port also sends internal flow control information to the near-end FC port. The near-end FC port controls the flow of data into the terminal based on the status of the far-end FC port buffer memory such that memory is always available to store the forwarded data in case the far-end client cannot accept the data. Thus throughput is maximized without incurring any data loss. An internal proprietary flow control algorithm is used to accomplish this function and is described in full detail later.

The ingress circuit (near-end) controls data flow into the terminal by providing a flow control signal to indicate when it is ready to receive packets. Standard fibre channel flow control is used at this interface. The ingress circuit transmits data frames to the far-end and ensures that the number of unacknowledged transmitted data frames is less than the buffer memory size. The ingress circuit receives buffer memory status from the far-end and uses this to determine how much memory is available and whether to continue or stop data flow.

An egress circuit at the receiving end recovers the modulated signal and inputs it into a FEC circuit that corrects errors in the transmission. The egress circuit extracts the Status information resulting in a return of the original data frames. The output timing is derived from a fixed oscillator. However, data delivery to the far end SAN is governed by a flow control mechanism which can only forward packets to the SAN depending on its availability. High-density buffer memory is used to store incoming fibre channel data and forward it to the far-end SAN per the flow control protocol. The Egress memory status is fed back to the ingress block and is used to start-stop traffic. The Egress circuit maps the data to a fixed output clock via the addition/subtraction of Idle characters. In this manner, fibre channel data is communicated across extended distances.

BRIEF DESCRIPTION OF THE DRAWINGS

A better understanding of the invention can be obtained from the following detailed description of one exemplary embodiment is considered in conjunction with the following drawings in which:

FIG. 7 is a block diagram depicting a forward error correction system according to the ingress block of the preferred embodiment of the present invention.

FIG. 9 is a block diagram depicting a forward error correction system according to the egress block of the preferred embodiment of the invention.

DETAILED DESCRIPTION OF THE PREFERRED EMBODIMENT

Figure 1:
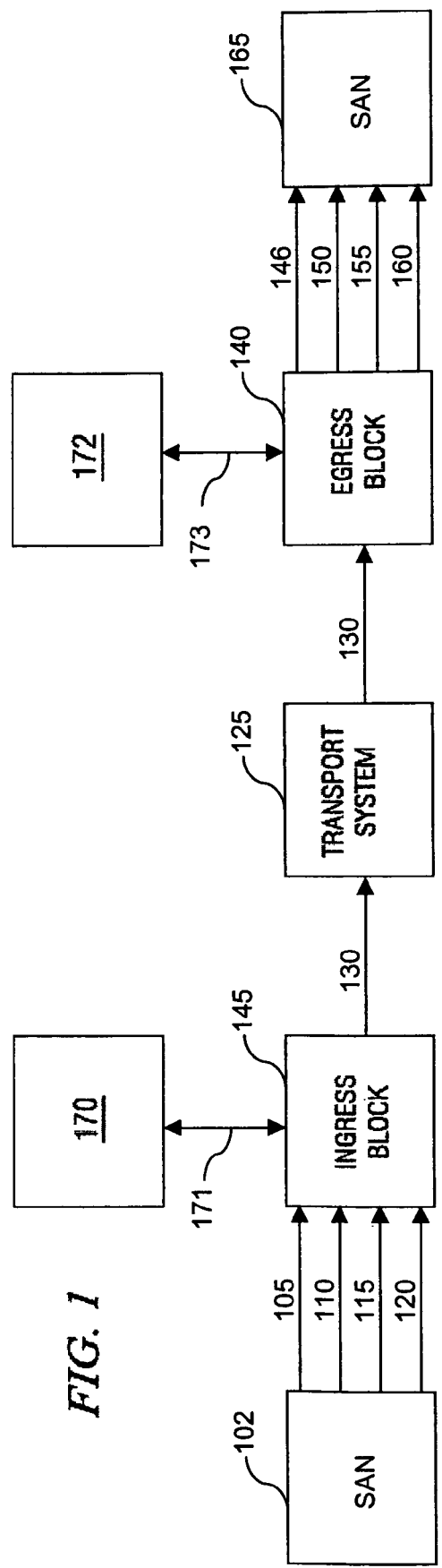
FIG. 1 is a block diagram depicting a transport system for SAN extension.

FIG. 1 shows a block diagram of the transport system for aggregation and distance extension of two storage area networks (SAN) across a wide geographical distance 100. System 100 is a full duplex transport system, the circuits used for aggregation and recovery at both ends of the network are mirror images of each other. SAN 102 and 165 may be up to 6000 km apart. SAN 102 and 165 can be alternately a fiber channel switch or fiber channel storage device. Over shorter distance, such as 1000 km, this the invention can support synchronous replication of fibre channel or FICON. For extended distances, the invention supports fibre channel or FICON asynchronous replication.

In the preferred embodiment, Signals 105, 110, 115, 120 and 146, 150, 155, 160 may be any combination of four Gigabit Fiber Channel interfaces (1.0625 Gbps) or four 2 GFC interfaces (2.125 Gbps). In an alternate embodiment only two of the signals are used to support two 4 GFC interfaces (4.25 Gbps). In yet another embodiment, a single signal carrying one 8 GFC or one 10 GFC interface (10.51875 Gbps) is implemented.

In the preferred embodiment, four independent 10 b encoded GFC/2 GFC data streams 105, 110, 115, and 120 are aggregated by ingress block 145 and transported across transport system 125 in a composite stream 130. Greater (up to 8) or fewer data streams may be accommodated in alternate embodiments by scaling the disclosed components. At ingress block 145, there is a timing uncertainty of approximately +/−100 parts per million (ppm) from the received nominal GFC/2 GFC signal from each data stream. The timing uncertainty is tracked and corrected in the ingress block 145. Preferably, composite stream 130 has a faster line clock rate greater than 400 parts per million (ppm) faster than the combined input data rate of the data streams. Table 1 above shows the line rates for all four data formats are nominally 400 ppm higher than the input data rate. The fast line clock rate prevents buffer overflow and ensures there are stuffing opportunities between packets to embed Idle characters and Status information. In order to increase the clock rate, data bytes are added or "stuffed" between packets in the ingress block 145. The result is that composite stream 130 contains a serial stream that is comprised of 16 data bits serialized in a serial/deserializer (SERDES 254 in FIG. 2). In the preferred embodiment, each GFC/2 GFC channel is mapped to 4 of the 16 bits of the composite data stream 130. However, it is possible to map each data stream to 2 of the 16 bits thus aggregating 8 GFC channels; or 8 of 16 for 4 GFC; or 16 of 16 for 10 GFC.

Composite stream 130 is transported across transport system 125 to egress block 140. Egress block 140 removes the stuffed data from composite stream 130 and maps the data to a fixed clock rate of 1.0625 or 2.125 Gbps for each GFC or 2 GFC data stream respectively. A fixed oscillator 680 (described in detail in reference to FIG. 6) in egress block 140 is implemented to clock the received GFC channels for each data stream. The recovered data for data streams 146, 150, 155, and 160 is identical to the Ingress path received data from data streams 105, 110, 115, and 120. Thereby multiple GFC/2 GFC streams are aggregated and transported over transport system 125.

Upstream processor 170 connected to ingress block 145 can add user data to a stuffing word through line 171. Downstream processor 172 through line 173 connected to egress block 140 reads the user data.

Figure 2:
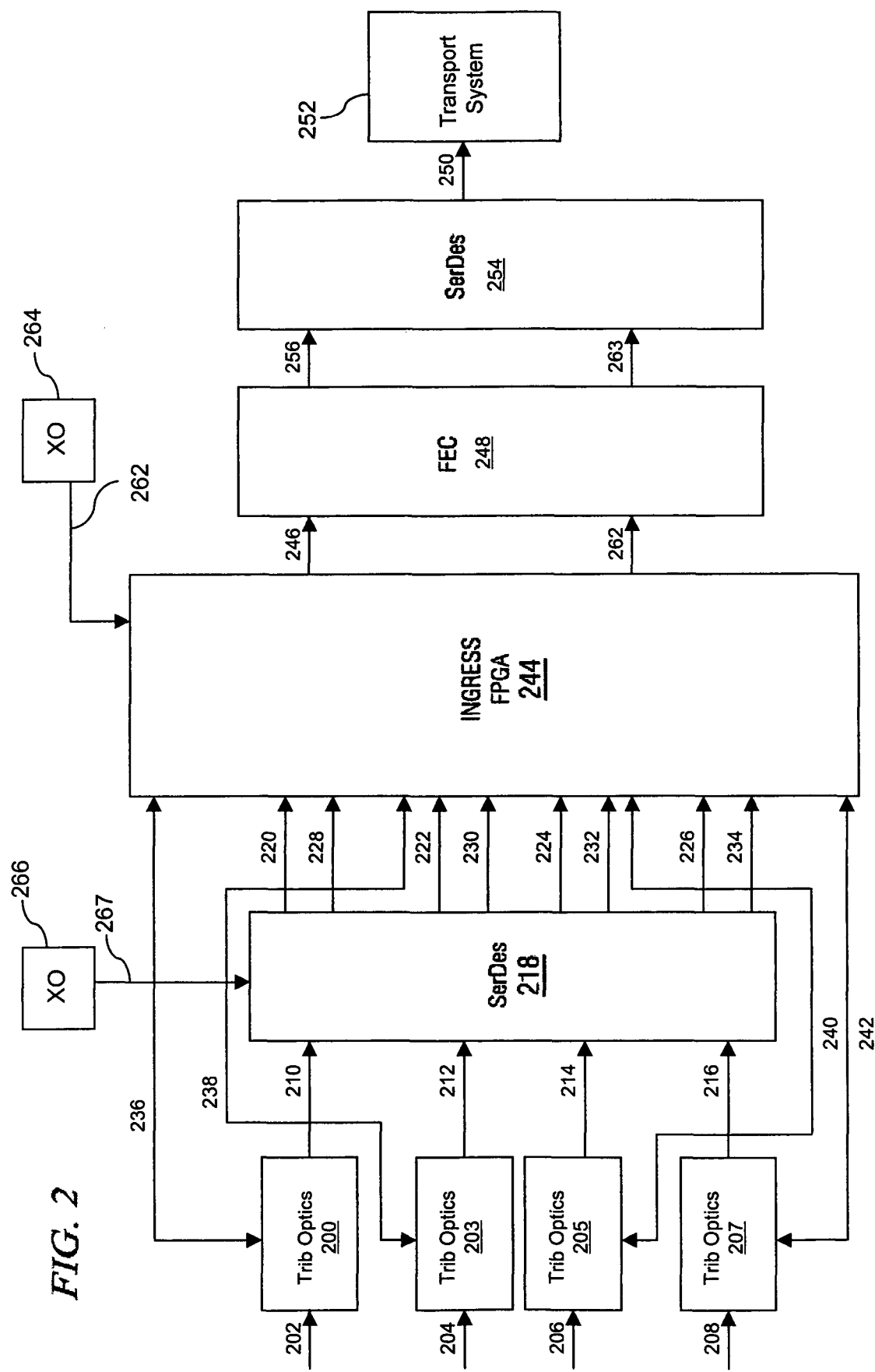
FIG. 2 is a block diagram depicting an ingress circuit according to the preferred embodiment of the present invention.

Referring to FIG. 2, a block diagram of the preferred embodiment of ingress block is shown in greater detail. Ingress block is shown in FIG. 2 as ingress block 201. The ingress path consists of four optical transceivers 200, 203, 205 and 207 each capable of receiving a single GFC/2 GFC data stream 202, 204, 206, and 208. In the preferred embodiment, each optical transceiver is a small form-factor pluggable (SFP) optical transceiver. Alternatively, an XFP optical module may be used instead of an SFP optical transceiver in the event that the system is configured to send one 10 GFC data stream. The four GFC/2 GFC data streams are converted into electrical output signals 210, 212, 214, and 216 by optical transceivers 200, 203, 205 and 207. Electrical output signals 210, 212, 214, and 216 are transmitted to Serializer/Deserializer (SerDes) 218. SerDes 218 receives electrical output signals 210, 212, 214, and 216 from optical transceivers 200, 201, 203, and 205 and generates recovered GFC/2 GFC clock signals 220, 222, 224, and 226; and 8 b encoded data plus one control bit for GFC/2 GFC data signals 228, 230, 232, and 234.

System clock 266 is a GFC reference clock that is used to generate the 106.25 MHz SERDES reference signal. The SERDES 218 uses the clock as a reference to recover input signal.

Recovered GFC clock signals 220, 222, 224, and 226 with nominal frequency of 106.25 MHz at single data rate clock for GFC and double data rate for 2 GFC; and 8 b encoded data signals plus control bit 228, 230, 232, and 234, are transmitted from SerDes 218 to Ingress field programmable gate array (FPGA) 244 where data signals 228, 230, 232, and 234 are processed into composite signal 246 as discussed below. The Ingress FPGA uses reference clock 264 via signal 262 as a reference to generate the composite signal 246. Composite signal 246 is comprised of n×622.08 MHz parallel signals governed by the line clock rate signal 262. In the preferred embodiment n is 16 and each GFC or 2 GFC is mapped to 4 of the 16 FEC channels. However, n can be as low as 2 where each GFC is mapped to 2 of the 16 FEC channels thus accomplishing 8 GFC channel aggregation. In the preferred embodiment, a 622.08 MHz clock is used for aggregating the individual data streams. However, alternate clock rates of 100 MHz to 810 MHz may be used depending on the application. The only restriction is that the output data rate must be greater than the aggregate input data rate as described earlier. The Ingress FPGA also communicates with the optical transceivers thru signal present status signals 236, 238, 240, and 242. These signals are discussed in more detail in the description of FIG. 3.

Composite signal 246 and associated clock 262 are received by ingress FEC 248 and processed into transport composite signal 256. Composite signal 256 contains 16 parallel FEC output signals at the faster line clock rate 263. As is known in the art, the FEC output signals contain both the data and the input clock encapsulated in the FEC code. When the receiving FEC performs error correction on the signal, both the data and clock are recovered by a method know in the art as "through timing".

Transport composite signal 256 is transmitted to SerDes 254. SerDes 254 serializes transport composite signal 256 into composite stream 250 comprised of a single bit wide channel at the fast clock rate of nominal speed of 12.44 Gbps. SerDes 254 transmits composite stream 250 to transport system 252 for transmission.

Figure 3:
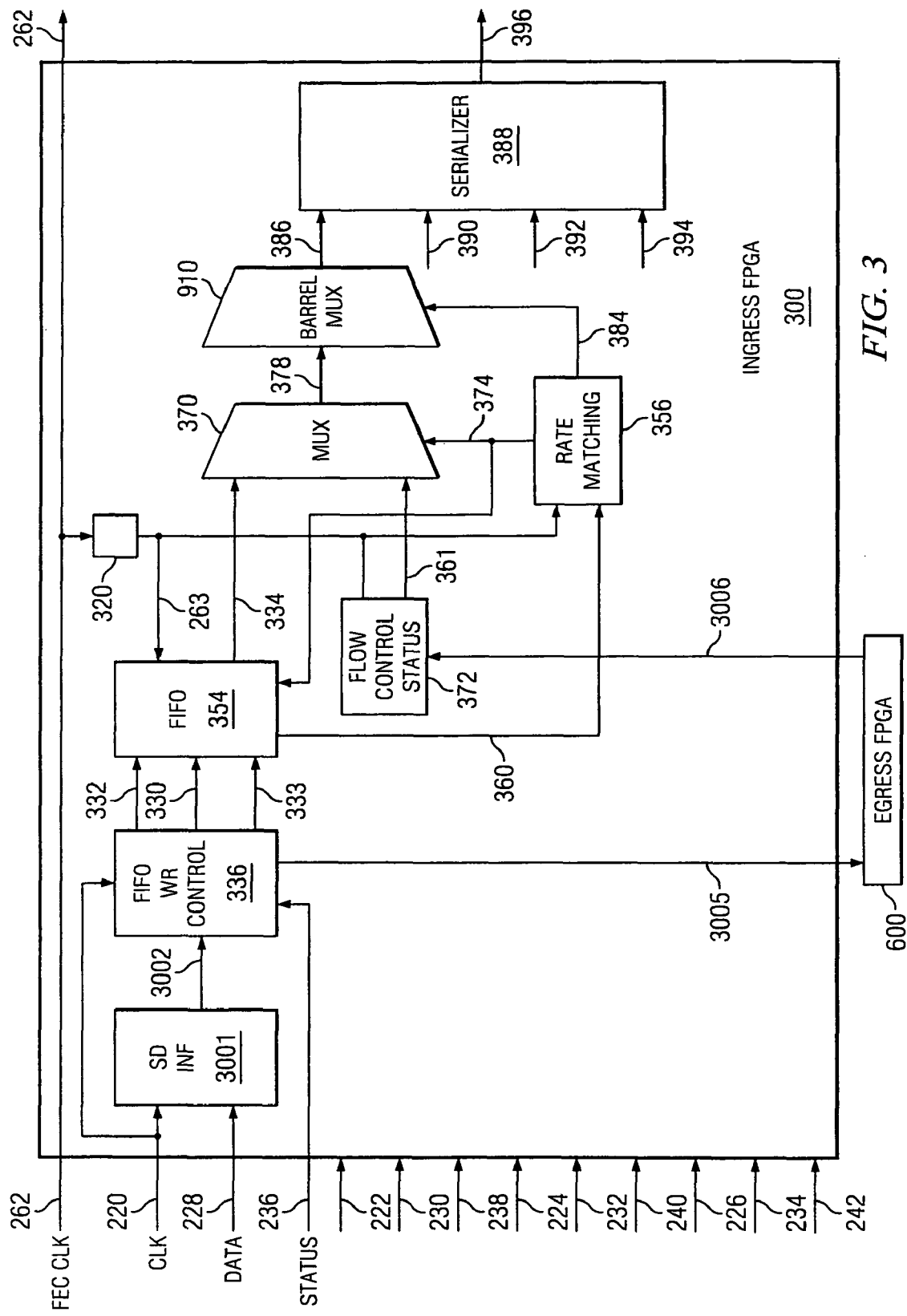
FIG. 3 is a block diagram depicting an ingress field programmable gate array according to the preferred embodiment of the present invention.

FIG. 3 is a block diagram showing a portion of the preferred embodiment of ingress FPGA 244 in greater detail. Ingress FPGA is shown in FIG. 3 as Ingress FPGA 300. Ingress FPGA 300 receives recovered FC clock signals 220, 222, 224, and 226, data signals 228, 230, 232, and 234, transmitted from SerDes 218 (FIG. 2). Ingress FPGA 300 receives signal present status signals 236, 238, 240, and 242 transmit from SFP 200, 201, 203 and 205 (FIG. 2). For simplification purpose, only one signal of each is shown 220, 228 and 236. Signal present status signal 236 is sent to FIFO write control logic 336. FC clock signal 220 and data signal 228 are sent to SerDes input Interface 3001. In the preferred embodiment, data signal 228 is at a rate of 106.25 MHz double data rate or DDR 9 bits wide (8 bits data (8 b)+1 control bit). Each FC clock signal 220, 222, 224, and 226 is plesiosynchronous (nearly simultaneously) to each other.

The SerDes input interface 3001 expands the 9 bit wide data stream 228 106.25 MHz for 2 G FC or 53.125 MHz for 1 G FC DDR bus to the 18 bit wide 106.25 MHz or 53.125 MHz single data rate SDR data stream 3002 and transmits it to FIFO write controller 336. FIFO write controller 336 monitors the 18 bits SDR data stream 3002 for FC idles and FC receiver readys. FIFO write controller 336 will remove all FC idles and FC receiver readys unless it is set for by pass buffer mode. FC idles and FC receiver readys are removed by turning off the write enable signal 333 to the FIFO circuit 354. The FC idle order set is represented by K28.5 followed by D21.4 followed by D21.5 followed by D21.5 followed by D21.5 as defined in ANSI X3.230 FC-1. The FC receiver ready order set is represented by K28.5 followed by D21.4 followed by D10.2 followed by D10.2 as defined in ANSI X3.230 FC-1. FIFO write controller 336 inserts a start of idle flag in the data stream to be used by the far-end Egress FPGA to determine where to insert FC Idles. The 9th bit or the lower control bit on the 18 bit data stream is used as the start of idle flag. This bit is normally always equal to zero since a control character is only valid in the upper byte according to ANSI X3.230 FC-1. Therefore it is available to be used as the start of idle flag. The FIFO write controller 336 transmits the 106.25 MHz clock signal 332 and data stream 330 to first-in/first-out buffer (FIFO) 354. The FIFO write controller 336 transmits flow control and status data stream 3005 to the local Egress FPGA 600. In the preferred embodiment the flow control and status data stream 3005 includes the following four signals as defined in ANSI INCITS 373-2003 Fiber Channel Standard Specific incorporated by reference:

Local loss of signal: lost signal coming into the ingress

Constant local ingress NOS: (Not operational sequence), message initially sent out before the fibre optical channel link is up Local FC receiver ready received Local ingress link reset primitive received In the preferred embodiment the flow control and status data stream 3005 also includes the following signals:

Local Packet received: indicates a frame has been received on the ingress side

Local ingress bad sync: signal error from the SAN by the SERIDES

Local ingress rate: specifies 1 gig or 2 gig fiber standard input

Local egress rate: specifies 1 gig or 2 gig fiber standard output

Figure 10:
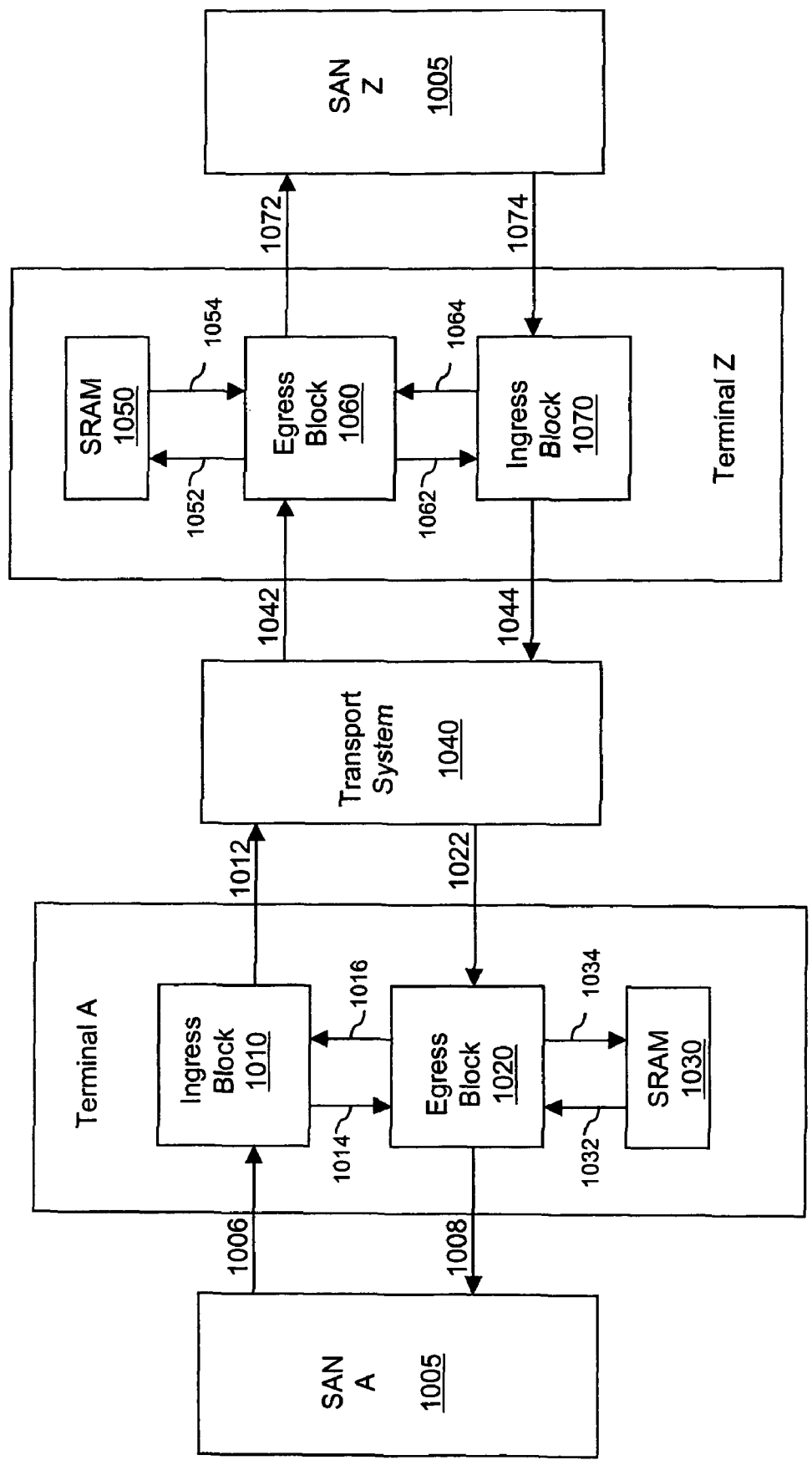
FIG. 10 is a block diagram depicting the internal and external flow control mechanisms used to convey traffic across large geographical distances.

Increment local ingress received block counter: number of bytes sent to the far end Auto detected local client buffer-to-buffer credit: buffer available in the local SAN The flow control and status data stream 3005 is analogous to signals 1014 and 1064 of FIG. 10.

Clock Divider 320 converts the FEC clock a 622.08 MHz clock signal 262 into a 155.52 MHz clock signal 263 to FIFO 354.

Preferably, FIFO 354 is a 1024×18 (18 bits wide, 1024 deep) dual port, dual clock domain FIFO. FIFO 354 is responsible for synchronization of multiple lower speed data streams to a singular a high speed data stream. FIFO 354 outputs aligned fast data signal 334 to multiplexer (mux) 370. Aligned fast data signal 334 is synchronized to faster line clock rate signal 263 via clock divider circuit 320 output clock rate signal 263. The FIFO 354 is written to at a maximum rate of 18 bits at 106.25 MHz or 1.9125M Bits/Second. The FIFO 354 is read at a maximum rate of 18 bits at 80% of 155.52 MHz or 2.239488M Bits/Second. At least every 5th clock the FIFO read is skipped to allow the barrel mux 910 to convert the 20 bit data 378 into 16 bit data 386. Occasionally more FIFO reads will be skipped to adjust ingress timing to prevent an FIFO underflow.

Rate matching controller 356 coordinates the processes necessary to add flow control/status words between frames and adjust timing of the ingress circuit. Rate matching controller 356 calculates the number of control/status words needed to adjust timing and transmits this number of control/status words to mux 370. It also calculates the necessary advancement of barrel mux 910 to properly align the output signal via control signal 384. Rate matching controller 356 adds control/status words when FIFO depth status signal 360 indicates the FIFO depth falls below a minimum threshold. The preferred minimum threshold is 50% of the total FIFO depth or (1024×0.25=512). Rate matching controller 356 adds flow control/status words by selecting flow control/status data stream 378 from flow control/status data stream 361 via mux select signal 374. Mux select signal 374 also controls the read of FIFO circuit 354.

Egress FPGA 600 transmits flow contol/status data stream 3006 to flow control/status logic 372. Flow control/status logic 372 transmits flow contol/status data stream 361 to mux 370. Mux 370 will pass through 18 bit data signal 334 plus 2 control bits or 18 bit data signal 361 plus 2 control bits to barrel mux 910 via 20 bit data signal 378 depending on the mux select signal 374 transmitted by add idle controller 356. The extra 2 control bits are used by the far-end 600 Egress FPGA's 20 Bit Aligner 608 (Shown on FIG. 6) to align the data stream.

Figure 8:
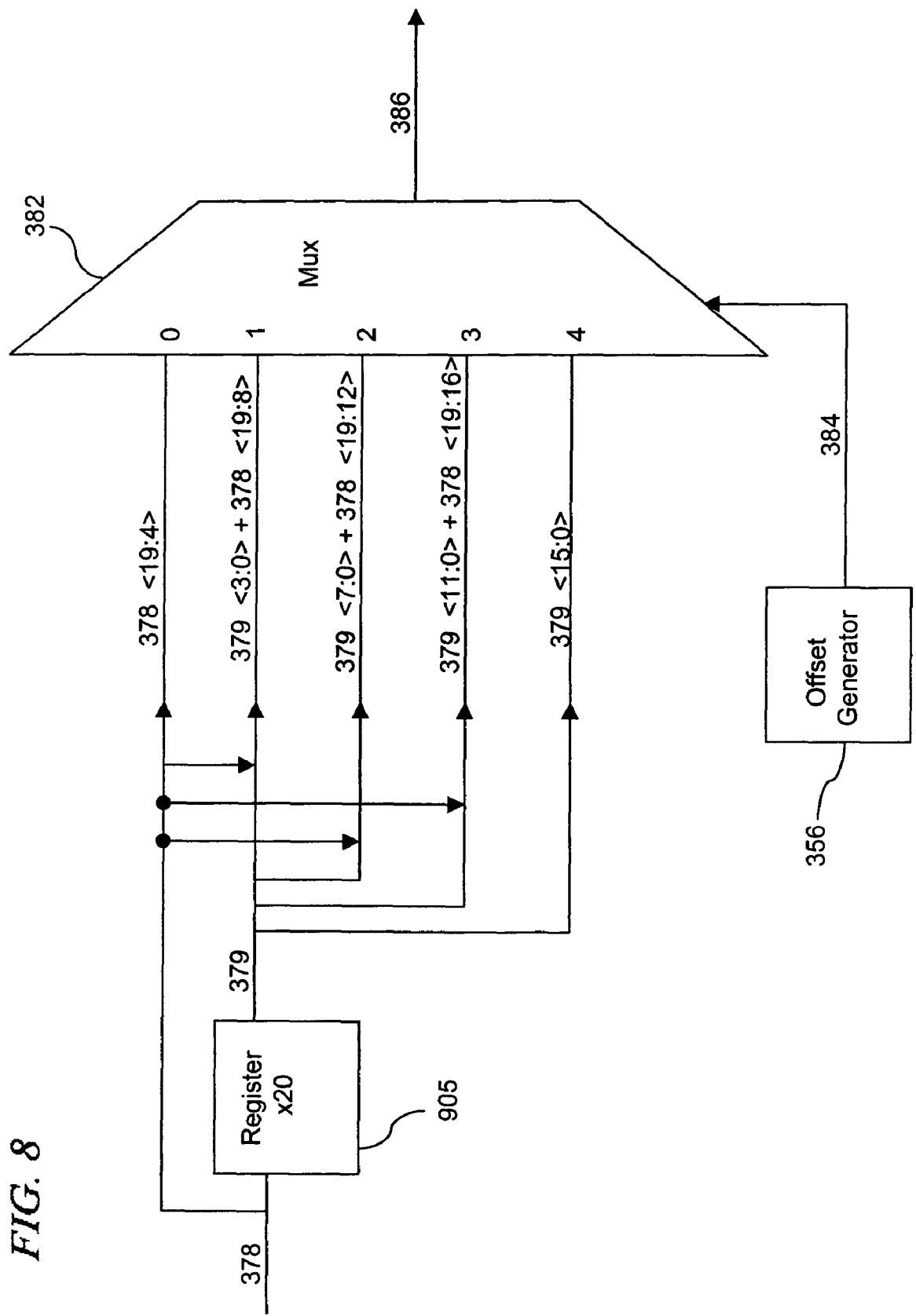
FIG. 8 is a block diagram depicting a 20-bit aligner circuit according to the preferred embodiment of the present invention.

Pipeline barrel roller mux 910 is shown in FIG. 8. Pipeline barrel roller mux 910 is used to convert the 20 bit data stream 378 into 16 bit data stream 386. Combined word signal 378 enters pipeline barrel roller mux 910 and is 20 bits wide at 155.52 MHz. Signal 378 enters register 905 which is a register 20 bits wide as shown by the ellipsis. Signal 378 is also shunted to the input of pipeline barrel roller mux 382. Register 905 delays signal 378 by a single clock tick resulting in delayed signal 379. Pipeline barrel roller 382 allows the data from register 905 to be shifted in time by 0 to 20 bits in 4 bit increments according to an offset signal 384 from stuff controller 356. Once shifted, the data is released through mux 382. For example, if offset signal 384 is 0, the data is shifted 4 bits and mux 382 passes bits 19 through 4 of signal 378 to signal 386. If offset signal 384 is set to 1, the data is shifted 8 bits. Mux 382 then releases bits 3 through 0 from register 905 and bits 19 through 8 of signal 378 to signal 386. If the offset signal 384 is set to 2, the data is shifter 12 bits. Mux 382 the releases bits 7 through 0 from register 905 and bits 19 through 12 of signal 378 to signal 386. If offset signal 384 is set to 3, the data is shifter 16 bits. Mux 382 the releases bits 11 through 0 from register 905 and bits 19 through 16 of signal 378 to signal 386. If offset signal 384 is set to 4, no shift will occur. Data bits 15 through 0 from register 905 will be passed without being shifted to signal 386.

Returning to FIG. 3, stuffed signal 386 is a 16 bit×155.52 MHz signal and is transmitted from pipeline barrel roller mux 910 to serializer 388. Second group of signals 222, 230 and 238, third group of signals 224, 232 and 240, fourth group of signals 226, 234 and 242, proceed along an analogous path through a parallel and duplicative set of devices (as shown by the ellipsis) to achieve signals analogous to signal 386 produced from first group of signals. Second group of signals produce signal 390. Third group of signals produce signal 392. Fourth group of signals produce signal 394. Signal 386 and signals 390, 392 and 394 are transmitted to serializer 388. Serializer 388 serializes the 16×155.52 MHz signals 386, 390, 392, and 394 into four 4×622.08 MHz signals, creating a 16×622.08 MHz composite signal 396. By adding flow control/status words when and if needed rate matching controller 356 ensures that all of the data streams are outputted at a common clock rate. Composite signal 396 emerges as composite signal 246 in FIG. 2 and is transmitted to FEC 248 in FIG. 2 as a 16 bit×622.08 MHz signal.

FEC 248 of FIG. 2 is shown in detail in FIG. 7 as FEC 800 and its functions will be described with respect to FIG. 7. FEC 800 assigns each outputted data stream in composite signal 246 to one of four FEC lanes 802, 804, 806, and 808 for transport. FEC 800 has a 16-bit SFI-4 interface running at 622.08 MHz clock rate to match the output of ingress FPGA 244. Ports 842-872 in FEC 800 act as 16 independent serial data ports. Assigning 4 FEC lanes 802, 804, 806, and 808 to GBE or FC stream 246 may map any format data mapped to any combination of transport channels to achieve serial communications without embedding control codes for channel identification. FEC 800 encapsulates the data in composite signal 246 mapping it to signals 874-904 providing a 25% overhead error correction code, which provides greater than 9 dB of coding gain. FEC 800 receives signal 262 and passes it through line side oscillator 908 to be reproduced and transmitted as signal 263 to SerDes 254. It must be understood that a plurality of clock rates may be specified for use in the operation of the present invention, but clocks rates exacting a ratio of 25% must be maintained in the preferred embodiment. For example, the clock rate for composite signal 246 can be up to 825 MHz and the clock rate for signal 262 can be up to 650 MHz. A plurality of FEC algorithms with overhead ratios up to 25% may be used depending on system requirements.

Figure 5:
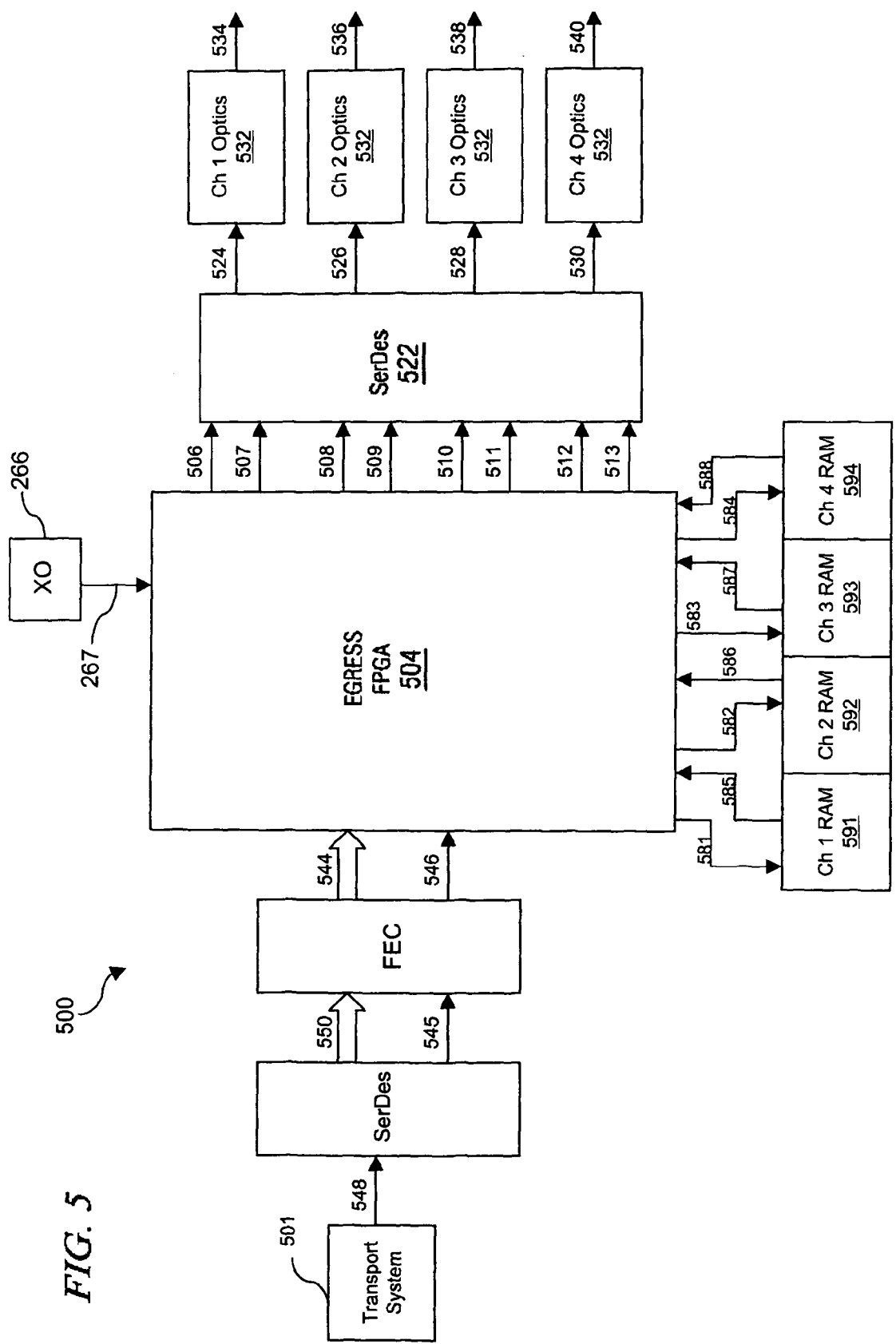
FIG. 5 is a block diagram depicting an egress circuit according to the preferred embodiment of the present invention.

FIG. 5 is a block diagram of the preferred embodiment of egress block 140 in FIG. 1 shown in greater detail. Egress block 140 of FIG. 1 is shown in FIG. 5 as 500. Incoming signal 548 is 1 bit wide 12.44 Gigabit per second optical signal at the aggregated transport rate. SerDes 542 deserializes composite signal 548 into 16-bit FEC encoded data signal 550, at a clock rate of 777.6 MHz, and transmits deserialized signal 550 to FEC 502. SerDes 542 also recovers clock signal 545, which is at a rate of 777.6 MHz and transmits it to FEC 502. FEC 502 performs error correction on deserialized signal 550 and recovers composite data signal 544 and composite 622.08 MHz clock signal 546. Composite clock signal 546 is at the 622.08 MHz clock rate of the ingress block and is 16 data bits wide. Composite data signal 544 and composite clock signal 546 are synchronous with each other and are transmitted to egress FPGA 504 for data stream and timing extraction.

The structure and function of FEC 502 is shown and described in reference to FIG. 9. FEC 502 assigns each output of data stream in composite signal 550 to one of four FEC lanes, 1002, 1004, 1006 and 1008, for decoding. FEC 502 has a 16-bit SFI 4 interface running at 622.08 MHz clock rate to match the output of SerDes 542. Ports 1002, 1004, 1006, and 1008 in FEC 502 act as sixteen independent serial data ports 1010-1040 with each port 1002, 1004, 1006, and 1008 translating to four ports. The sixteen independent serial ports 1010-1040 of FEC 502 strips the error correction from the encapsulated data in composite signal 550, mapping it to signals 1074-1104, extracting the 25% overhead error correction code to obtain the 9 decibels of coding gain. FEC 502 receives 777.6 MHz clock signal 545, passes it through oscillator 1108 to reproduce 622.08 MHz clock signal 546.

Referring again to FIG. 5, Egress FPGA 504 re-clocks the signal and transmits four synchronous GFC/2 GFC channels 506, 508, 510, and 512 to SerDes 522 as 10 bit wide (10 b) 106.25 MHz data clocked signals for GFC/2 GFC.

SerDes 522 serializes synchronous GFC/2 GFC channels 506, 508, 510, and 512 which are each 106.25 MHz, and transmits four synchronous GFC/2 GFC data streams 524, 526, 528, and 530 which are 1 bit wide 1.0625/2.125 GHz for GFC/2 GFC respectively and contain the same data as the four input synchronous data streams 105, 110, 115, and 120 (FIG. 1) to SFP 532. SFP 532 converts the electrical synchronous GBE or FC data streams 524, 526, 528, and 530 to optical outputted synchronous GFC/2 GFC data streams 534, 536, 538, and 540.

Egress FPGA 504 writes to and reads from memory 591-594 as described. In the preferred embodiment, the memory is partitioned into four segments 591-594 for the four ingress data channels 105,110,115, and 120 of FIG. 1 which exit from the egress block 504 as 146,150,155, and 160 of FIG. 1 (shown as 534,536,538, and 540 on FIG. 5) respectively. The egress FPGA 504 writes to the four channels of memory via signal 581, 582, 583, and 584. The egress FPGA 504 reads from the four channel 1-4 memory via signals 585-588. The data flow for one of the channels will be described and is identical for all channels.

Figure 6:
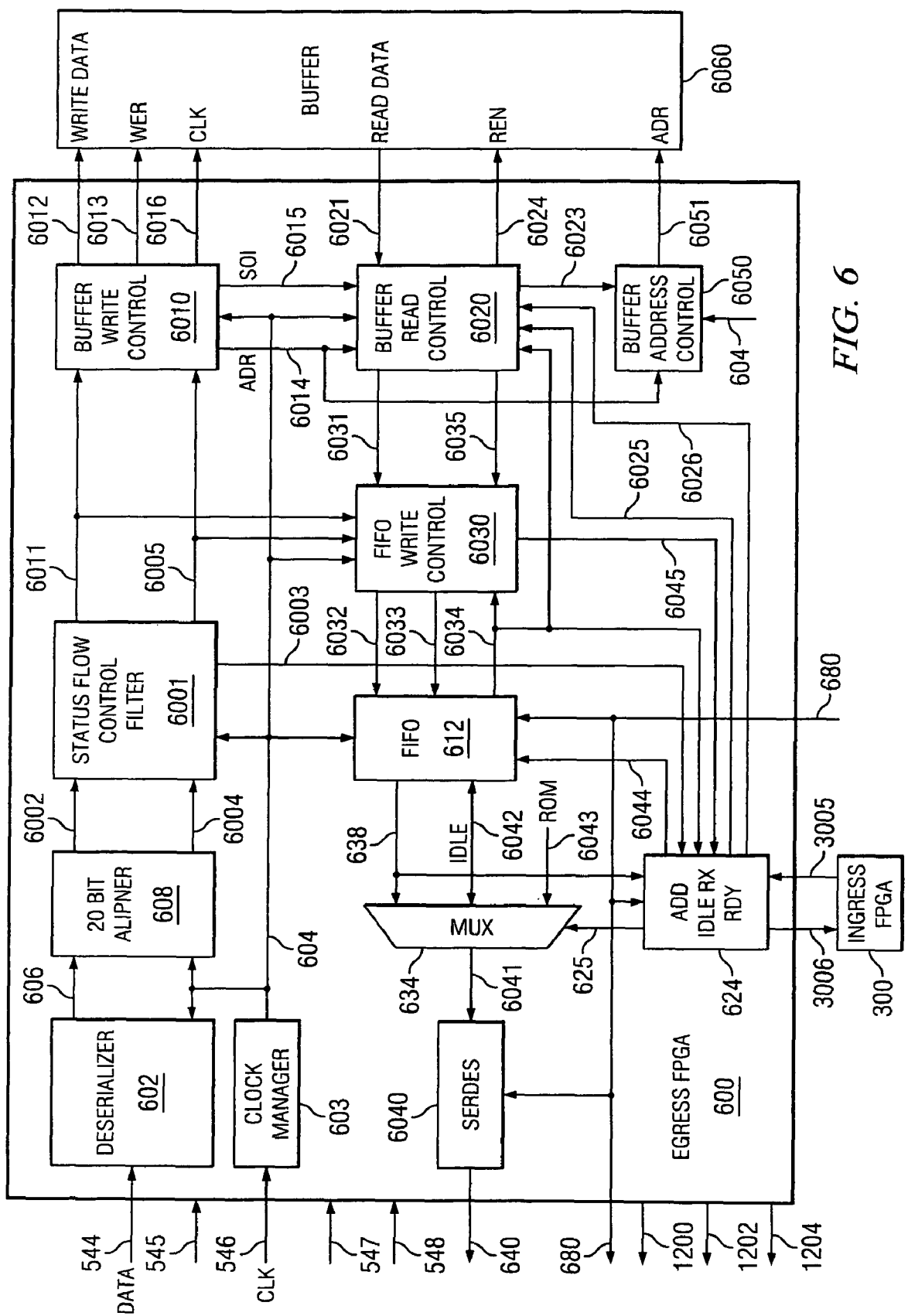
FIG. 6 is a block diagram depicting an egress field programmable gate array according to the preferred embodiment of the present invention.

FIG. 6 is a block diagram showing the preferred embodiment of egress FPGA 504 in greater detail. FPGA 504 is shown in FIG. 6 as 600. Deserializer 602 deserializes composite signal 544 from a 4×622.08 MHz signal into a 16×155.52 MHz deserialized signal 606. Deserialized signal 606 is transmitted from deserializer 602 to 20 bit aligner circuit 608. Composite clock signal 546 runs at 622.08 MHz and is connected to clock manager 603 where it is converted into a 155.52 MHz clock signal 604. Clock signal 604 is connected to deserializer 602, 20 bit aligner circuit 608, flow control/status filter controller 6001, buffer write controller 6010, buffer read controller, buffer address controller, 6020 FIFO write control logic 6030 and the write clock of FIFO 612.

Figure 4:
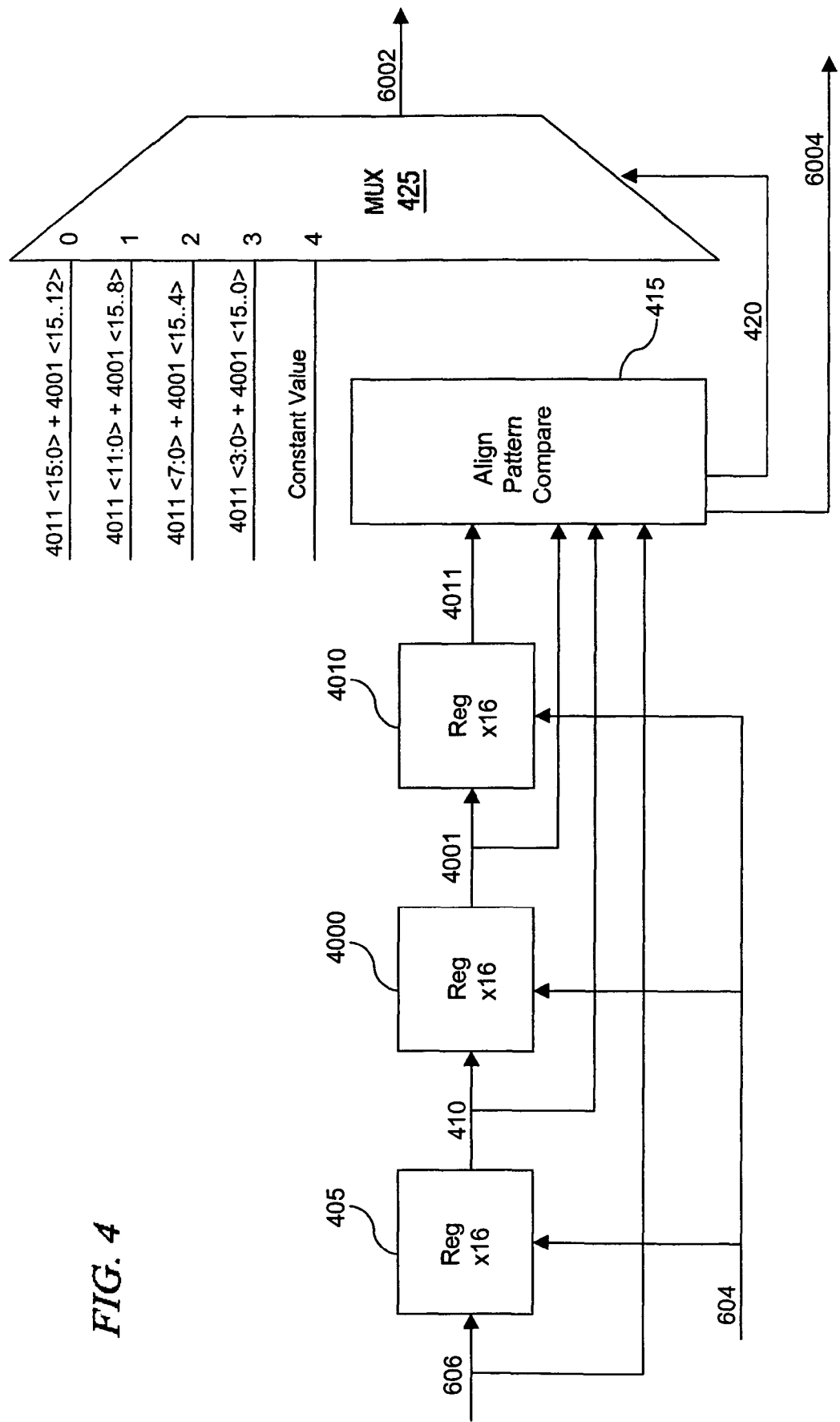
FIG. 4 is a block diagram depicting the 20-bit pipeline barrel data roller MUX

FIG. 4 is a block diagram showing the preferred embodiment of the 20 bit aligner circuit 608 is shown in greater detail. The 20 bit aligner circuit 608 is used to convert the 16 bit data 606 into 20 bit data 6002. Clock signal 604 is distributed to register 405, 4000, 4010. Clock signal is used as a reference by the registers 405, 4000, 4010 to delay their respective incoming signals. The signal 606 enters the 20 bit aligner circuit 608 and is 16 bits wide at 155.52 MHz. Signal 606 enters register 405 which is a register 16 bits wide as shown by the ellipsis. Signal 606 is also shunted to the input of the alignment pattern compare 415. Register 405 delays signal 606 by a single clock tick resulting in delayed signal 410. Signal 410 is also shunted to the input of the alignment pattern compare 415. Register 4000 delays signal 410 by a single clock tick resulting in delayed signal 4001. Signal 4001 is also shunted to the input of the alignment pattern compare 415. Register 4010 delays signal 4001 by a single clock tick resulting in delayed signal 4011. Signal 4011 is also shunted to the input of the alignment pattern compare 415. The 20 bit aligner circuit 608 allows the combined 32 bits data stream of 4001 and 4010 to be multiplexed by mux 425 into a single 20 bit data stream 6002. For example when the alignment pattern 0xFFE is simultaneously detected on data bits 3 to 0 of signal 4011 and data bits 15 to 8 of signal 4001 and data bits 15 to 4 of signal 410 and data bits 11 to 0 of signal 606, offset signal 420 will be reset. When the offset signal 420 is equal to 0, signal 411 15-0 and 4001 15-12 is passed to signal 6002. When the offset signal 420 is equal to 1, signal 411 11-0 and 4001 15-8 is passed to signal 6002. When the offset signal 420 is equal to 2, signal 411 7-0 and 4001 15-4 is passed to signal 6002. When the offset signal 420 is equal to 3, signal 411 3-0 and 4001 15-0 is passed to signal 6002. When the offset signal 420 equals 4 a constant filler value is sent to signal 6002 and the data valid signal 6004 is set to inactive.

The offset signal 420 is incremented after every clock except during the above described reset condition. When the offset signal 420 is less than 4 the data valid signal 6004 is set to active. The 20 bit data aligner 608 transmits a data valid signal 6004 to the flow control/status filter logic 6001.

Returning to FIG. 6 the flow control/status filter logic 6001 filters the far-end flow control and far-end status from the aligned data stream 6002 and transmits it via signal 6003 to the add FC idle/FC receiver ready logic 624. When the 20th bit of the aligned data stream 6002 is equal to one it indicates the current value of the aligned data stream 6002 is far-end flow control information or far-end status information. The flow control/status filter logic 6001 filters to the far-end flow control and far-end status by turning off the data valid signal 6005 to the buffer write control logic 6010 and the FIFO write control logic 6030. The flow control/status filter logic 6001 strips off the two extra alignment bits that were inserted at the ingress FPGA FIFO write control logic 336 of FIG. 3 and transmits the buffer data stream 6011 to the buffer write control logic 6010 and FIFO write control logic 6030.

The buffer write control logic 6010 calculates the write address 6014 and transmits it to buffer address control 6050 and buffer read control 6020. The write address starts at zero and increments by one after every write. The buffer write control logic 6010 converts the 18 bit wide SDR 155.52 MHz incoming data stream 6011 to a 9 bit wide DDR 155.52 MHz data stream 6012. The buffer write control logic 6010 transmits the data stream 6012 to the external buffer memory 6060. The incoming data valid signal 6005 is transported to the external buffer memory 6060 as the buffer write control signal 6013. The buffer write control logic 6010 detects start of idle flags written to the buffer memory 6060 by monitoring the 9$^{th}$ bit of the incoming data stream 6011 and transmits the incoming start of idle flag signal 6015 to buffer read control logic 6020. The 9$^{th}$ bit of the incoming data 6011 set to one and an active data valid signal indicates the presents of an incoming start of idle. The buffer write control logic 6010 transmits the buffer clock signal 6016 to the external buffer memory 6060.

The buffer read control logic 6020 calculates the read address 6023 and transmits it to buffer address control logic 6050. The read address starts at zero and increments by one after every read. The buffer read control logic 6020 converts the 9 bit wide 155.52 MHz DDR incoming data stream 6021 to an 18 bit wide 155.52 MHz SDR outgoing data stream 6031. Data stream 6031 is transmitted to the FIFO write control logic 6030. The buffer read control logic generates the data valid signal 6035 to the rate adjustment logic 6030. The buffer read control logic 6020 controls buffer reads by monitoring the available buffer credit, buffer depth and the number of current start of idle flags in the buffer memory 6060. The initial available buffer-to-buffer credit is received via the buffer credit signal 6026 from the add FC idle/receiver ready logic 624. Every time a FC start of frame ordered set is read out the buffer memory 6060 and detected on the data stream 6021 the outstanding buffer-to-buffer credit count is incremented by one. The FC start of frame order set is represented by K28.5 followed by D21.5 followed by two more bytes that are class dependent as defined in ANSI X3.230 FC-1. Every time a local FC receiver ready is detected via the local FC receiver ready signal 6025 from the Add FC Idle/Receiver Ready logic 624 the available buffer-to-buffer credit is decremented. When the current buffer-to-buffer outstanding credits is greater than the available credits initiating buffer reads is disabled. In the preferred embodiment there are two conditions that will initiate a series of buffer reads when there is at least one available buffer-to-buffer credit. The first is when the buffer depth is calculated to be greater than 1024. The second is when the number of current start of idle flags in the buffer memory 6060 is greater than zero. The buffer depth is calculated by comparing the current write and read addresses. The current start of idle flag counter is incremented by one when the incoming start of idle flag signal 6015 from the buffer write control logic 6010 is set. Every time a start of idle flag is read out of external buffer memory 6060 and detected on the data stream 6021 the current start of idle flag counter is decremented by one. Once a series of buffer reads is begun they will continue until one of three events occur. FIFO depth data stream 6034 signal from FIFO 612 indicates that the FIFO is full, start of idle flag is read out of buffer memory 6060 or the buffer depth equals zero. The buffer read control logic 6020 enables buffer memory reads via the buffer read enable signal 6024. The buffer read control logic 6020 transmits the read buffer data stream 6031 and read buffer data valid signal 6035 to the FIFO write control logic 6030.

The buffer address logic 6050 sources the write address stream 6014 from the buffer write logic 6010. The buffer address logic 6050 sources the read address stream 6023 from the buffer read logic 6020. The buffer address logic 6050 converts the two incoming 22 bit wide 155.52 MHz SDR address buses into a single 22 bit wide 155.52 MHz DDR address bus 6051. The buffer address logic 6050 transmits the combined buffer address signal 6051 to the external buffer memory 6060. In the preferred embodiment the external buffer memory 6060 will use the rising edge of the buffer clock signal 6016 to clock in the buffer read address and the external buffer memory 6060 will use the falling edge of the buffer clock signal 6016 to clock in the buffer write address.

The FIFO write control logic 6030 will select between the non-buffered data stream 6011 and the associated data valid signal 6005 and the buffered data stream 6031 and the associated data valid signal 6035 and transport it to FIFO 612 via the outgoing data stream 6032 and write enable signal 6033. In by pass buffer mode the non-buffered data stream and the associated data valid signal 6005 is transported to FIFO 612. In normal operation the buffered data stream 6031 and the associated data valid signal 6035 are transported to FIFO 612. The FIFO write control logic 6030 recognizes primitive sequences. In the preferred embodiment the FIFO write control logic 6030 will remove individual primitives of a primitive sequence if the 1024 deep by 18 bit wide FIFO 612 depth is greater than 90% full. FIFO depth signal 6034 is sourced from FIFO 612. The FIFO write control logic 6030 will detect start of idle flags on the 9$^{th}$ bit or the lower control bit of the 18 bit buffered data stream 6032 and transmit it to the add FC idle/FC receiver ready logic 624 via the start of idle signal 6045.

Preferably, FIFO 612 is a 1024 deep by 18 bits wide dual port, dual clock domain FIFO. FIFO 612 outputs aligned slow read data signal 638 to multiplexer (mux) 634. Aligned slow read data signal 638 is synchronized to slower line clock 106.25 MHz rate signal 680. The FIFO 612 write operations are synchronized to the 155.52 MHz clock 604. Since the read operations are slower than the write operations a method to prevent FIFO overflow is needed. The FIFO write control logic 6030 prevents FIFO 612 overflows by deleting individual primitives of primitive sequences when the FIFO 612 is starting to fill up. This could potentially be required during the FC link recovery process describe in the ANSI INCITS 373-2003 section 7.3 or when the by-pass buffer mode is active. In the preferred embodiment the buffer read control logic 6020 will prevent FIFO 612 overflows by halting buffer reads therefore halting FIFO writes when FIFO 612 depth is greater than 90% full.

The add FC idle/FC receiver ready logic 624 transmits the FIFO read signal 6044 to the FIFO 612 to control FIFO reads. The FIFO read is control by monitoring the FIFO 612 depth status via signal 6034, the incoming start of idle signal 6045 from the FIFO write control 6030, the outgoing start of idle signal from FIFO 612 via the $9^{th}$ bit or the lower control bit on the 18 bit FIFO data stream 638, the current client available buffer-to-buffer credit and the current far-end available buffer count. In the preferred embodiment there are two conditions that will initiate a series of FIFO reads. The first is when FIFO 612 is greater than 85% full as indicated by the FIFO depth status signal 6034. The second is when the number of current start of idle flags currently in the FIFO 612 is greater than zero. The current start of idle flag counter is incremented by one when the incoming start of idle flag signal 6045 from the FIFO write control logic 6030 is set. Every time a start of idle flag is read out FIFO and detected on the data stream 638 the current start of idle flag counter is decremented by one. Once a series of FIFO reads is begun they will continue until a start of idle flag is read out of the FIFO 612 on the FIFO data stream 638. While FIFO 612 is read the add FC idle/FC receiver ready logic 624 selects the FIFO data stream 638 to pass through mux 634 to the data stream 6041. While the FIFO 612 is not read the add FC idle/FC receiver ready logic 624 selects the FC idle pattern 6042 to the data stream 6041. If there are greater than zero current pending outgoing receiver readys while the FC idle pattern 6042 is currently selected and the estimated far-end available buffer space is greater than the maximum potential buffer space required for the local ingress data stream 202 of FIG. 2, the add FC idle/FC receiver ready logic 624 will select the FC receiver ready pattern 6043 through mux 634. The add FC idle/FC receiver ready logic 624 transmits the mux select signal 625 to control the output of mux 634. The current pending receiver ready count is increment by one when a local ingress received packet flag is set via the flow control/status data stream 3005 from the Ingress FPGA 300. The current pending receiver ready count is decremented by one whenever the add FC idle/FC receiver ready logic 624 selects the FC receiver ready pattern 6043 through mux 634. The method of calculating the far-end available buffer space is described in the FIG. 10 flow control description section. The maximum buffer space required for the local ingress data stream 202 of FIG. 2 is calculated with the following algorithm: Max buffer bytes required=Max packet length in bytes*Far-End buffer-to-buffer credits. The add FC idle/FC receiver ready logic transports the local receiver ready signal 6025 and the local auto detected buffer-to-buffer credit signal 6026 to the buffer read control logic 6020. The add FC idle/FC receiver ready logic 624 transmits the flow control and status data stream to Ingress FPGA 300 via the data stream 3006 to be transported to the far-end Egress FPGA. In the preferred embodiment the flow control and status data stream 3006 consists of the following signals: Local loss of signal, Constant local ingress NOS, Local ingress bad sync, Local ingress rate, FLOW_CONTROL.BufferSize or Local Egress buffer size in bytes, FLOW_CONTROL.BB_Credit or Auto detected local client buffer-to-buffer credit or, and FLOW_CONTROL.Transmitted or Total number of Egress blocks transported to the local egress client or. Preferably, a block is defined as 4320 bytes or (2×(Max FC Frame Size+12 bytes of internal overhead)). The flow control and status data stream 3006 is analogous to signals 1016 and 1062 of FIG. 10.

The mux circuit 634 will pass through FIFO 612 18 bit output data stream 638 or the FC idle pattern 6042 or the FC receiver ready output signal 6043 based on the value of the select control signal 625 sourced from the add FC idle/FC receiver ready logic 624. The mux circuit 634 transmits the resulting muxed data stream 6041 to the external SerDes output interface logic 6040.

The SerDes interface logics converts the 18 bit wide 106.25 MHz SDR data stream 6041 to an 9 bit wide 106.25 MHz DDR for 2 G FC or 106.25 MHz SDR for 1 G FC data stream 640. The data stream 640 is sent to SerDes 522 (FIG. 5) and is analogous to signal 506.

The structure and function of components described with respect to signal 544 are duplicated for signals 545, 547, and 548 resulting in signals 1200, 1202 and 1204 which are sent to SerDes 522 as shown by the ellipsis. Signals 1200, 1202 and 1204 are analogous to signals 507, 508 and 509 (FIG. 5).

The structure and function of components described with respect to signal 544 are duplicated for signals 545, 547, and 548 resulting in signals 1200, 1202, 1204, 1206, 1208, and 1210 which are sent to SerDes 522. Signals 1200, 1202, 1204, 1206, 1208, and 1210 are analogous to signals 508-513.

FIG. 10 depicts two storage area networks SAN A 1005 and SAN Z 1080 separated by a large geographical distance. For simplicity, the flow control of only one of four independent 10 b encoded GFC/2 GFC data streams from SAN A 1005 to SAN Z 1080 is described in detail. The described example is the data path from 105 to 146 of FIG. 1. The flow control for the other data streams is identical. Returning to FIG. 10, data path 1006, 1012, 1042, and 1072 represent data flow in the AZ direction. Data path 1074, 1044, 1022, and 1008 represent data flow in the ZA direction. Only the flow control in the AZ direction is described in the following paragraphs. However, to understand the flow control fully, it is necessary to show the AZ flow control using both the AZ data stream and the ZA data stream. ZA flow control is identical to the AZ flow control only in the reverse directions.

The local Ingress 1010 and Egress blocks 1020 work in concert to execute fibre channel flow control with SAN A 1005 in the AZ direction. The Ingress Block 1010 will non-intrusively monitor the FC logins, as defined by FC ANSI X3T11, from SAN A 1005 to determine the SAN A 1005 buffer-to-buffer credit. The detected buffer-to-buffer credit value will be transported to the Egress Block 1020 via signal 1014 and used for external FC flow control according to standard FC method. The Egress Block will not transmit a frame unless the available buffer-to-buffer credit in SAN A 1005 is greater than 0. The detected buffer-to-buffer credit value is also transmitted to the Egress Block 1060 via signal 1012, transport system 1040, and signal 1042 to control data flow in the ZA direction. Egress Block 1060 uses the detected buffer-to-buffer credit value to allocate a portion of SRAM 1030 for proprietary internal flow control. The Egress Block 1060 will not send FC Receiver Ready's unless the buffer SRAM 1030 has enough available bytes to hold the number of buffer-to-buffer credits thereby controlling ZA data flow 1074 into ingress block 1070 from SAN Z 1080. After a restart of any interface due to a power-up, Link RESET protocol, or other action, the Fibre Channel Ingress 1010 and Egress 1060 blocks go through an initialization procedure.

The initialization is shown in Table 2. The Egress 1020 block waits for flow control message from Egress block 1060 via Ingress block 1070. The initial flow control status message (referred to as FLOW_CONTROL Message) from Egress block 1060 to Egress block 1020 contains the buffer space in bytes available for storage at SRAM 1050 at the far end of the network. This estimate is defined by a variable named FAR_END_AVAILABLE. The FLOW_CONTROL Message is sent continuously between Egress 1060 and Egress blocks 1020 for the AZ direction (and 1020 to 1060 for the ZA direction) and the last message received is saved.

TABLE 2

Near-end FC port initialization

| Psuedocode | Functional Description |
| --- | --- |
| Unacknowledged = 0 | No FLOW_CONTROL Message which indicates there is no signal with respect to buffer availability on the far end |
| Wait for FLOW_CONTROL message from far-end FC port | Local egress block waits for a signal indicating buffer availability on the far end |
| Far_End_Available = FLOW_CONTROL.BufferSize | Full buffer size is available at far-end |
| Last_FLOW_CONTROL = FLOW_CONTROL | Saves the size of the buffer available at the far end. |

The Egress block 1060 initialization procedure is shown in Table 3. The Egress block 1060 records the buffer size in bytes that is available at SRAM 1050 in the variable FLOW_CONTROL_Buffer_Size. Furthermore, the Ingress block 1070 will detect the number of buffer credits available at receiving SAN Z 1080 by snooping the client login command on data 1074. Snooping the client login is done by identifying login frames which can monitor the frame header and the service parameters block for unique values as defined by ANSI INCITS for SAN communication. This value is transported to the Egress block 1060 via signal 1064. The Egress block will record the value as the variable BB_credit. Initially, the variable FLOW_CONTROL.Transmitted_Bytes is set to zero. The BB_Credit_Count is set to zero since no frames have been sent and no acknowledgements have been received.

TABLE 3

Egress Block Initialization.

| Psuedocode | Functional Description |
| --- | --- |
| Empty the buffer | Reset read and write addresses to indicate buffer memory is clear. |
| Wait for log-in from client | Waiting for the login frame from the SAN |
| FLOW_CONTROL.BufferSize = Buffer size (bytes) | Stores size of local buffer memory in a variable |
| FLOW_CONTROL.BB_Credit = BB_Credit from client log-in | Stores number of the buffer credits in a variable |
| FLOW_CONTROL.Transmitted_Bytes = 0 | A variable is set indicating that the amount of data sent is zero. |
| BB_Credit_Count = 0 | A variable is set indicating that no frames have been sent under the Fibre Channel Standard. |

The Egress Block 1020 identifies far end SRAM 1050 buffer availability status as a function of received fibre channel frames from SAN A 1005 as shown in Table 4. The data 1006 from SAN A 1005 entering Ingress Block 1010 of Terminal A is transmitted to Egress block 1060 via signal 1012; transport system 1040, and signal 1042. The Ingress Block 1010 of Terminal A indicates the number of bytes of data sent via signal 1014 to the Egress Block 1020. The variable FAR_END_AVAILABLE number is decremented by the bytes of data sent.

TABLE 4

Local Egress Block 1020 tracking of buffer availability status in far end SRAM

| Psuedocode | Functional Description |
| --- | --- |
| Detect number of bytes in frame sent | Egress block receives of bytes sent by local ingress block |
| Far_End_Available = Far_End_Available − (number of bytes in the frame) | Decrement the Far_End_Available (minimum number of bytes available) by the number of bytes in the received frame |
| If Far_End_Available >= (Last_FLOW_CONTROL.BB_Credit − Unacknowledged) *MAX_FRAME_SIZE | Allocate a portion of memory in far end SRAM to account for the number of buffer credits available in local SAN and compare the allocated memory to the available memory |
| Send R_RDY to client | Transmit a fibre channel receiver ready to local SAN enabling it to send a frame or |
| Else Unacknowledged = Unacknowledged + 1 | Set of variables indicating that there is Insufficient space at far-end for additional frame |

1050 in response to data frames received from SAN A 1005

TheEgress block 1020 updates the SRAM 1050 availability as a function of the number of bytes transmitted to SAN Z 1080. This information is received via the FLOW_CONTROL message from Egress block 1060 as shown in Table 5. The FLOW_CONTROL message from Egress Block 1060 arrives via signal 1062 to Ingress block 1070. Ingress block 1070 inserts the FLOW_CONTROL message within the ZA data 1074 and sends it via 1044 to transport system 1040. The message arrives at Egress block 1020 via signal 1022. If there is a change in memory availability, the change is used to increment the number of additional bytes available at SRAM 1050. The SRAM 1050 availability is tracked based on the number of bytes transmitted to Egress 1060 and the number of bytes transmitted from Egress 1060 to SAN Z 1080. As long as there is sufficient buffer available at the far end to prevent data overflow, the Egress block 1020 allows SAN A 1005 to send data via signal 1006. This method ensures that the far end buffers cannot overflow.

TABLE 5

Local Egress Block 1020 tracks buffer availability in SRAM 1050 based on data sent to SAN Z 1080.

| Psuedocode | Comment |
| --- | --- |
| If FLOW_CONTROL ≠ Last_FLOW_CONTROL Far_End_Available = Far_End_Available + (FLOW_CONTROL.Transmitted − Last_FLOW_CONTROL.Transmitted) Last_FLOW_CONTROL = FLOW_CONTROL | If the received FLOW_CONTROL message is different than the last FLOW_CONTROL message Then increment the estimated Far_End_Available variable by the additional bytes transmitted to SAN Z |
| If ((Far_End_Available ≧ (Last_FLOW_CONTROL.BB_Credit − Unacknowledged) * MAX_FRAME_SIZE) AND (Unacknowledged > 0)) | |

TABLE 5-continued

Local Egress Block 1020 tracks buffer availability in
SRAM 1050 based on data sent to SAN Z 1080.

| Psuedocode | Comment |
|---|---|
| Send R_RDY to client | Transmit a fibre channel receiver ready to local SAN enabling it to send a frame |
| Unacknowledged = Unacknowledged − 1 | Decrement a variable indicating the number of local frames waiting to be sent. |

The interface between SAN A 1005 and Ingress Block 1010 is per the Fibre Channel standard protocol. Egress Block 1020 enables R_RDY acknowledgement signal to SAN A 1005 via signal 1008 as long as there is sufficient space in SRAM 1050 at the far end of the system. When far end buffer is not available, the flow of R_RDY to SAN A 1005 via signal 1008 is stopped thus stopping traffic into Ingress block 1010 via 1006.

Egress block 1060 receives data from Ingress Block 1010 via transport system 1040 via signal 1042 and stores it in SRAM 1050 via signal 1052 as shown in Table 6. The Egress block 1020 reduces the memory availability per the number of bytes received (in variable FLOW_CONTROL_available).

TABLE 6

Egress block 1060 tracks buffer availability count in SRAM 1050

| Psuedocode | Comment |
|---|---|
| Store frame in buffer | Egress block stores the incoming frame in SRAM buffer. |
| FLOW_CONTROL.Available = FLOW_CONTROL.Available − number of bytes in received frame | Decrement the buffer space available by the number of bytes in the received frame |
| If (BB_Credit_Count <FLOW_CONTROL.BB_Credit) | If local SAN still has buffer space |
| Send next frame from buffer to client | Then transmit frame to local SAN |
| FLOW_CONTROL.Available = FLOW_CONTROL.Available + number of bytes in transmitted frame | Increment the buffer space available by the number of bytes in the transmitted frame |

TABLE 6-continued

Egress block 1060 tracks buffer availability count in SRAM 1050

| Psuedocode | Comment |
|---|---|
| FLOW_CONTROL.Transmitted = FLOW_CONTROL.Transmitted + number of bytes in transmitted frame | Increment the number of bytes transmitted by the number of bytes in the transmitted frame |

Egress block 1060 executes standard fibre channel protocol via signal 1072 with SAN Z 1080 as shown in Table 7 to transmit frames of data to SAN Z 1080. Egress block 1060 sends data to SAN Z 1080 based on the number of buffer credits available recorded at initialization in variable BB_credit_count. This count defines the number of packets that can be sent to SAN Z without overflowing its buffers. After the initial count is received, as packets are transmitted from Egress Block 1060 to SAN Z 1080, this number is decremented. As SAN Z 1080 acknowledges receipt of the packets with the R_RDY signal sent via signal 1074 thru Ingress block 1070 and signal 1064, the credit count is incremented. This method is per the standard fibre channel protocol and enables Egress Block 1060 to keep track of buffer availability in SAN Z 1080 and only send packets when buffers are available. As long as buffer availability (BB_credit_count) does not reach zero, data continues to flow from Egress 1060 to SAN Z 1080. If the credit count reaches zero, the incoming data frames arriving over 1042 start filling up SRAM 1050 and reduce memory availability. As discussed earlier, when memory availability reaches zero, the flow control message to the Egress block 1020 initiates backpressure that halts traffic. This ensures that SRAM 1050 does not overflow

TABLE 7

Egress block 1060 executes Fibre Channel
Flow control with SAN Z 1080

| Psuedocode | Comment |
|---|---|
| BB_Credit_Count = BB_Credit_Count − 1 | Decrement the variable BB_Credit_Count indicating more memory available in the local SAN due to the receipt of a receiver ready from the local SAN. |
| If (BB_Credit_Count <FLOW_CONTROL.BB_Credit) Send next frame from buffer to client | If local SAN still has buffer space Then transmit a frame to local SAN |
| FLOW_CONTROL.Available = FLOW_CONTROL.Available + number of bytes in transmitted frame | and increment the buffer space available variable by the number of bytes in the transmitted frame |
| FLOW_CONTROL.Transmitted = FLOW_CONTROL.Transmitted + number of bytes in transmitted frame | Increment the number of bytes transmitted variable by the number of bytes in the transmitted frame |
| BB_Credit_Count = BB_Credit_Count + 1 | Increment the variable indicating less memory available due to the transmission of a frame. |

SRAM 1050 is required because of the transmission delay between SAN A 1005 and SAN Z 1080. SAN A 1005 and Terminal A 1000 may be up to 100 km away. Similarly SAN Z 1080 and Terminals Z may also be up to 100 km away. The two terminals may be more than 3000 km away from each other. So the data flow between terminals A to terminal Z undergoes a delay through transport system 1040. The received signal 1042 from transport system 1040 is delayed with respect to the transmit signal 1012. The delay is approximately 4.85 microseconds per kilometer in optical fibre and depends on the geographical distance between the two terminals. Similarly, the flow control message from Egress 1060 to Ingress 1010 incurs the same delay. In order maximize throughput and prevent interruption of traffic, the buffer memory must be able to store data equivalent to the round trip time of the transport system. Therefore, the size of SRAM 1050 must increase as the geographical distance between terminal A and Z increases. In the preferred embodiment, a geographical distance in excess of 3000 km is used and this distance is expandable to 6000 km.

The size of SRAM 1050 determines the maximum geographical distance without loss of throughput between SAN A 1005 and SAN Z 1080. The data stored in SRAM 1050 is at the 8 b-encoded data rate of 1.7 Gbps plus the control character. In the preferred embodiment, 8 MB of SRAM expandable to 16 MB is allocated for each Fibre channel port. In the preferred embodiment, there are 4 fibre channel ports and thus four memory banks. The calculation for the distance of each memory bank is shown below.

Memory=8 MB per Fibre Channel Port (105, 110, 115, 120 FIG. 1) or 6.711 e7 bits Data Rate=1.7 Gbps with 8 b encoding (2.125 Gbps input at 10 b encoding)

Max Latency=# bit in memory/8 b encoded bit rate=39.476 milliseconds

Round trip time per km=0.01 ms per km

Max Distance=latency/round trip time per km=3948 km

As shown, a distance of about 3948 km is possible between the two terminals. If the 16 MB version of SRAM is used, the distance doubles to approximately 7896 km.

The memory architecture is such that the SRAM 1050 is separated into 4 banks that can be addressed individually or as a whole. The enables support of all of the data formats previously described. For example, for 10 GFC the memory can be combined as a whole and the max distance is 2552 km expandable to 5104 km as shown in Table 8 below. The table shows how the memory can be allocated depending on which fibre channel standards are aggregated.

TABLE 8

Dynamic memory allocation for mapping Fibre Channel data

| Data Type | Data Rate (Gbps) | Memory Banks | Memory per Bank (bits) | Max Latency (ms) | Max Distance (km) |
|---|---|---|---|---|---|
| GFC | 1.0625 (10 b) 0.85 (8 b) | 4 | 6.711e7 | 79 | 7900 |
| 2 GFC | 2.125 (10 b) 1.7 (8 b) | 4 | 6.711e7 | 39.5 | 3950 |
| 4 GFC | 4.25 (10 b) 3.4 (8 b) | 2 | 1.342e8 | 39.5 | 3950 |
| 8 GFC | 8.5 (10 b) 6.8 (8 b) | 1 | 2.684e8 | 39.5 | 3950 |
| 10 GFC | 10.5188 (66 b/64 b) | 1 | 2.684e8 | 25.52 | 2552 |

Another feature of the design is that it includes a built-in delay mechanism that enables customer programmable delay between the SANs (SAN A 1005 and SAN Z 1080 FIG. 10). This feature is extremely important because the applications running on top of fibre channel must be optimized to handle the delay incurred in transport. Including the delay feature within the transport equipment allows users to optimize their applications without the need for additional equipment.

Referring to FIG. 5, in the preferred embodiment, channel 2 SRAM 592 provides the delay function for channel 1 data leaving port 1 (506 and 507). Channel 1 thru 4 composite data 544 enters the egress block 504 and is separated into the 4 individual channels. Channel 1 data is then sent to Channel 2 SRAM 592 via 582. The SRAM is addressed as 16 bit wide addresses at 4 MB (4194304 addresses). The data is written starting at address 0 and continues to address 4194304 and rolls over back to address 0. The data is read starting at address 0 at a later time per a user programmable delay. The time offset between the write and read operation results in a delay. The delayed data 586 is read into the Egress FPGA 504 and normal flow control operations as defined earlier are applied. During this operation Ch 1 SRAM is used as previously defined to provide the buffering for flow control. Similarly, channel 4 SRAM 594 provides delay for channel 3 data leaving port 3 (508 and 509).

The amount of delay is calculated based on the time offset between the write and read operations. The SRAM is configured as a FIFO (first in first out) and the data is stored at a rate of 155.52 MHz. So the time resolution for delay is 6.43 ns or 1.286 meters. Therefore the total delay possible is (4194304× 6.43 ns) 26.969 milliseconds. The one-way transit time is about 0.005 ms per km and the total distance simulated is 5393.8 km. A counter is used to set up a user programmable delay at the 155.52 MHz clock. So the delay is programmed in increments of 6.43 ns. This allows delay values between 0 and 5393.8 km in increments of 1.286 meters.

Although the invention has been described with reference to one or more preferred embodiments, this description is not to be construed in a limiting sense. For example the method and apparatus can be used to aggregate and transparently transport a variety of formats and is not limited to Gigabit Ethernet, Fibre Channel, and FICON formats. There is modification of the disclosed embodiments, as well as alternative embodiments of this invention, which will be apparent to persons of ordinary skill in the art, and the invention shall be viewed as limited only by reference to the following claims.

The invention claimed is:

1. A system for controlling a flow of data over an optical transport system, the system comprising:
   an ingress terminal in communication with a first network, wherein the ingress terminal is configured to receive the data from the first network; and
   an egress terminal in communication with the ingress terminal comprising a memory, wherein the egress terminal is configured to receive the data from the ingress terminal over the optical transport system and transmit the data to a second network, and wherein said memory is configured to store the data received by the egress terminal from the ingress terminal;
   wherein the ingress terminal is configured to enable transmission of the data from the first network to the ingress terminal only when the memory is available to store the data,
   wherein the ingress terminal is configured to determine memory availability based, at least in part, on a data amount transmitted by the ingress terminal to the egress terminal.

2. The system of claim 1, wherein the ingress terminal comprises an ingress circuit and an egress circuit.

3. The system of claim 2, wherein the egress circuit is configured to receive a first message from the egress terminal indicating an amount of available storage space in the memory, and wherein the egress circuit is further configured to record the amount of available storage space as a variable.

4. The system of claim 3, wherein the ingress circuit is configured to transmit a signal to the egress circuit indicating a data quantity transmitted from the ingress terminal to the egress terminal.

5. The system of claim 4, wherein the egress circuit is configured to update the variable based on the transmitted data quantity.

6. The system of claim 5, wherein the variable update includes decrementing the amount of available storage space to reflect the transmitted data quantity.

7. The system of claim 3, wherein the egress circuit is configured to receive a second message from the egress terminal indicating a data quantity transmitted from the egress terminal to the second network.

8. The system of claim 7, wherein the egress circuit is configured to update the variable based on the transmitted data quantity.

9. The system of claim 8, wherein the variable update includes incrementing the amount of available storage space to reflect the transmitted data quantity.

10. The system of claim 1, wherein the egress terminal comprises an egress circuit and an ingress circuit.

11. The system of claim 10, wherein the ingress circuit is configured to detect a number of buffer credits available at the second network and to transmit a signal to the egress circuit indicating the number of available buffer credits, and
wherein the egress circuit is configured to store the number of available buffer credits as a variable.

12. The system of claim 11, wherein the egress circuit is configured to update the variable based on a data quantity transmitted from the egress terminal to the second network.

13. The system of claim 12, wherein the variable update includes decrementing the number of available buffer credits to reflect the transmitted data quantity.

14. The system of claim 12, wherein the egress circuit is configured to update the variable based on an acknowledgement that the second network received the transmitted data quantity.

15. The system of claim 14, wherein the variable update includes incrementing the number of available buffer credits to reflect the received transmitted data quantity.

16. The system of claim 1, wherein the ingress terminal is configured to cause the first network to cease transmitting the data if the memory is not available to store the data.

17. The system of claim 1, wherein the data from the first network comprises a first packet-based data stream and a second packet-based data stream, and
wherein the first packet-based data stream comprises a first data rate and the second packet-based data stream comprises a second data rate.

18. The system of claim 17, wherein the first data rate is different than the second data rate.

19. The system of claim 17, wherein the ingress terminal is configured to aggregate the first and second packet-based data streams into a composite packet-based data stream having a third data rate.

20. The system of claim 1, wherein the first and second networks each comprise a respective storage area network.

21. The system of claim 1, wherein the memory comprises static random access memory.

22. The system of claim 21, wherein the static random access memory includes four banks to accommodate a plurality of data formats.

23. The system of claim 1, wherein an interface between the first network and the ingress terminal comprises a Fibre Channel standard protocol.

24. The system of claim 1, wherein the ingress terminal and the egress terminal are each configured to be separated by a geographical distance of up to approximately 6,000 km.

25. A method for controlling a flow of data over an optical transport system, the method comprising:
determining whether a memory in an egress terminal is available to store the data received by the egress terminal based at least in part on a data amount transmitted to the egress terminal;
allowing transmission of the data from a first network to an ingress terminal only when the memory is available to store the data;
receiving the data from the first network; and
transmitting the data over the optical transport system from the ingress terminal to the egress terminal.

26. The method of claim 25, further comprising receiving a message from the egress terminal indicating an amount of available storage space in the memory and recording the amount of available storage space as a variable.

27. The method of claim 26, further comprising updating the variable based on a data quantity transmitted to the egress terminal.

28. The method of claim 27, wherein updating the variable comprises decrementing the amount of available storage space to reflect the transmitted data quantity.

29. The method of claim 25, further comprising:
receiving a first message from the egress terminal indicating an amount of available storage space in the memory;
recording the amount of available storage space as a variable; and
receiving a second message from the egress terminal indicating a data quantity transmitted from the egress terminal to a second network.

30. The method of claim 29, further comprising updating the variable based on the transmitted data quantity.

31. The method of claim 30, wherein updating the variable includes incrementing the amount of available storage space to reflect the transmitted data quantity.

32. The method of claim 25, further comprising receiving the data at the egress terminal and transmitting the data to a second network.

33. The method of claim 32, further comprising detecting a number of buffer credits available at the second network and storing the number of available buffer credits as a variable.

34. The method of claim 33, further comprising updating the variable based on a data quantity transmitted from the egress terminal to the second network.

35. The method of claim 34, wherein updating the variable includes decrementing the number of available buffer credits to reflect the transmitted data quantity.

36. The method of claim 34, further comprising updating the variable based on an acknowledgement that the second network received the transmitted data quantity.

37. The method of claim 36, wherein updating the variable includes incrementing the number of available buffer credits to reflect the received transmitted data quantity.

38. The method of claim 25, further comprising causing the first network to cease transmitting the data if the memory is not available to store the data.

39. The method of claim 25, wherein the data from the first network comprises a first packet-based data stream and a second packet-based data stream, and
wherein the first packet-based data stream comprises a first data rate and the second packet-based data stream comprises a second data rate.

40. The method of claim 39, wherein the first data rate is different than the second data rate.

41. The method of claim 39, further comprising aggregating the first and second packet-based data streams into a composite packet-based data stream having a third data rate.

42. The method of claim 25, wherein the first network comprises a storage area network.

43. The method of claim 25, wherein the memory comprises static random access memory.

44. The method of claim 43, wherein the static random access memory includes four banks to accommodate a plurality of data formats.

45. The method of claim 25, wherein the data from the first network comprises a data format defined by a Fibre Channel standard protocol.

46. An apparatus for controlling a flow of data over an optical transport system, the apparatus comprising:
an ingress block in communication with a first network, wherein the ingress block is configured to receive the data from the first network and to transmit the data to an egress terminal over the optical transport system; and
an egress block in communication with the ingress block and the first network comprising a memory, wherein the egress block is configured to allow the first network to transmit the data to the ingress block only when the memory of the egress terminal is available to store the data, wherein said memory is configured to store data received by said egress block, and
wherein the egress block is configured to determine memory availability based, at least in part, on a data amount transmitted by the ingress block to the egress terminal.

47. The apparatus of claim 46, wherein the egress block is configured to receive a message from the egress terminal indicating an amount of available storage space in the memory and to record the amount of available storage space as a variable.

48. The apparatus of claim 47, wherein the egress block is configured to update the variable based on a data quantity transmitted from the ingress block to the egress terminal.

49. The apparatus of claim 48, wherein the variable update includes decrementing the amount of available storage space to reflect the transmitted data quantity.

50. The apparatus of claim 46, wherein the egress block is configured to receive a message from the egress terminal indicating a data quantity transmitted from the egress terminal to a second network.

51. The apparatus of claim 50, wherein the egress block is configured to update the variable based on the transmitted data quantity.

52. The apparatus of claim 51, wherein the variable update includes incrementing the amount of available storage space to reflect the transmitted data quantity.

53. The apparatus of claim 46, wherein the egress block is configured to cause the first network to cease transmitting the data if the memory is not available to store the data.

54. The apparatus of claim 46, wherein the data from the first network comprises a first packet-based data stream and a second packet-based data stream, and
wherein the first packet-based data stream comprises a first data rate and the second packet-based data stream comprises a second data rate.

55. The apparatus of claim 54, wherein the first data rate is different than the second data rate.

56. The apparatus of claim 54, wherein the ingress block is configured to aggregate the first and second packet-based data streams in a native mode into a composite packet-based data stream having a third data rate.

57. The apparatus of claim 46, wherein the first network comprises a storage area network.

58. The apparatus of claim 46, wherein the memory comprises static random access memory.

59. The apparatus of claim 58, wherein the static random access memory is separated into four banks to accommodate a plurality of data formats.

60. The apparatus of claim 46, wherein an interface between the first network and the ingress block comprises a Fibre Channel standard protocol.

61. The apparatus of claim 46, wherein the ingress block and the egress terminal are each configured to be separated by a geographical distance of up to approximately 6,000 km.

62. An apparatus for controlling a flow of data over an optical transport system, the apparatus comprising:
an ingress block in communication with an ingress terminal via the optical transport system and with a first network; and
an egress block comprising a memory, wherein the egress block is in communication with the first network, with the optical transport system, and with the ingress block, wherein the egress block is configured to receive the data from an ingress terminal over the optical transport system, to store the received data in the memory, and to transmit the received data to the first network;
wherein the apparatus is configured to notify the ingress terminal as to an amount of available storage space in the memory by communicating the amount of available storage space from the egress block to the ingress block followed by communicating the amount of available storage space from the ingress block to the ingress terminal via the optical transport system.

63. The apparatus of claim 62, wherein the ingress block is configured to detect a number of buffer credits available at the first network and to transmit a signal to the egress block indicating the number of available buffer credits.

64. The apparatus of claim 63, wherein the egress block is configured to store the number of available buffer credits as a variable.

65. The apparatus of claim 64, wherein the egress block is configured to update the variable based on a data quantity transmitted to the first network.

66. The apparatus of claim 65, wherein the variable update includes decrementing the number of available buffer credits to reflect the transmitted data quantity.

67. The apparatus of claim 65, wherein the egress block is configured to update the variable based on an acknowledgement that the first network received the transmitted data quantity.

68. The apparatus of claim 67, wherein the variable update includes incrementing the number of available buffer credits to reflect the received transmitted data quantity.

69. The apparatus of claim 62, wherein the notification to the ingress terminal as to the amount of available storage space in the memory is used to determine whether a second network is allowed to transmit additional data to the ingress terminal.

70. The apparatus of claim 62, wherein the data from the ingress terminal comprises a composite packet-based data stream having a first data rate.

71. The apparatus of claim 70, wherein the composite packet-based data stream comprises a first packet-based data stream and a second packet-based data stream, and
wherein the first packet-based data stream comprises a second data rate and the second packet-based data stream comprises a third data rate.

72. The apparatus of claim 71, wherein the second data rate is different than the third data rate.

73. The apparatus of claim 62, wherein the first network comprises a storage area network.

74. The apparatus of claim 62, wherein the memory comprises static random access memory.

75. The apparatus of claim 74, wherein the static random access memory is separated into four banks to accommodate a plurality of data formats.

76. The apparatus of claim 62, wherein an interface between the first network and the egress block comprises a Fibre Channel standard protocol.

77. The apparatus of claim 62, wherein the egress block and the ingress terminal are each configured to be separated by a geographical distance of up to approximately 6,000 km.

78. A system for controlling a flow of data over an optical transport system, the system comprising:
an ingress means comprising means for receiving the data from a first network; and
an egress means comprising means for receiving the data from the ingress means over the optical transport system and for transmitting the data to a second network, and comprising a memory means for storing the data received by the egress means from the ingress means;
wherein the ingress means further comprises means for enabling transmission of the data from the first network to the ingress terminal only when the memory means is available to store the data, and
wherein the ingress means further comprises means for determining memory availability based, at least in part, on a data amount transmitted by the ingress means to the egress means.

79. The system of claim 78, wherein the ingress means further comprises means for receiving a first message from the egress means indicating an amount of available storage space in the memory means, and
wherein the ingress means further comprises means for recording the amount of available storage space as a variable.

80. The system of claim 79, wherein the ingress means further comprises means for updating the variable based on a data quantity transmitted from the ingress means to the egress means.

81. The system of claim 80, wherein the variable update includes decrementing the amount of available storage space to reflect the transmitted data quantity.

82. The system of claim 79, wherein the ingress means further comprises means for receiving a second message from the egress means indicating a data quantity transmitted from the egress means to the second network.

83. The system of claim 82, wherein the ingress means further comprises means for updating the variable based on the transmitted data quantity.

84. The system of claim 83, wherein the variable update includes incrementing the amount of available storage space to reflect the transmitted data quantity.

85. The system of claim 78, wherein the egress means further comprises means for detecting a number of buffer credits available at the second network and for transmitting a signal to the ingress means indicating the number of available buffer credits, and
wherein the egress means further comprises means for storing the number of available buffer credits as a variable.

86. The system of claim 85, wherein the egress means further comprises means for updating the variable based on a data quantity transmitted from the egress means to the second network.

87. The system of claim 86, wherein the variable update includes decrementing the number of available buffer credits to reflect the transmitted data quantity.

88. The system of claim 85, wherein the egress means further comprises means for updating the variable based on an acknowledgement that the second network received the transmitted data quantity.

89. The system of claim 88, wherein the variable update includes incrementing the number of available buffer credits to reflect the received transmitted data quantity.

90. The system of claim 78, wherein the ingress means further comprises means for causing the first network to cease transmitting the data if the memory means is not available to store the data.

91. The system of claim 78, wherein the data from the first network comprises a first packet-based data stream and a second packet-based data stream, and
wherein the first packet-based data stream comprises a first data rate and the second packet-based data stream comprises a second data rate.

92. The system of claim 91, wherein the first data rate is different than the second data rate.

93. The system of claim 91, wherein the ingress means further comprises means for aggregating the first and second packet-based data streams into a composite packet-based data stream having a third data rate.

94. The system of claim 78, wherein the first and second networks each comprise a respective storage area network.

95. The system of claim 78, wherein the memory means includes four banks to accommodate a plurality of data formats.

96. The system of claim 78, wherein an interface between the first network and the ingress means comprises a Fibre Channel standard protocol.

97. The system of claim 78, wherein the ingress means and the egress means are each configured to be separated by a geographical distance of up to approximately 6,000 km.

* * * * *

UNITED STATES PATENT AND TRADEMARK OFFICE
CERTIFICATE OF CORRECTION

PATENT NO. : 7,782,778 B2
APPLICATION NO. : 11/006939
DATED : August 24, 2010
INVENTOR(S) : Sheth et al.

It is certified that error appears in the above-identified patent and that said Letters Patent is hereby corrected as shown below:

Title page 2, item (56), under "U.S. Patent Documents", in Column 2, Line 51, delete "Bellatao et al." and insert -- Bellato et al. --.

Title page 3, item (56), under "Other Publications", in Column 2, Line 1, delete "Compter" and insert -- Computer --.

Drawing Sheet 5 of 9, Figure 5, Line 1 (Below reference numeral 500), below "SerDes" insert -- 542 --.

Drawing Sheet 5 of 9, Figure 5, Line 1 (Below reference numeral 500), below "FEC" insert -- 502 --.

Drawing Sheet 6 of 9, Figure 6, Line 2 (in Box 608), delete "ALIPNER" and insert -- ALIGNER --.

Column 1, line 10, delete "24,2003" and insert -- 24, 2003 --.

Column 6, line 37, delete "MUX" and insert -- MUX. --.

Column 7, line 34, delete "SERDES" and insert -- SerDes --.

Column 8, line 10, delete "SERDES" and insert -- SerDes --.

Column 8, line 11, delete "SERDES" and insert -- SerDes --.

Column 9, line 42, delete "SERIDES" and insert -- SerDes --.

Column 10, line 20, delete "contol/status" and insert -- control/status --.

Column 10, line 22, delete "contol/status" and insert -- control/status --.

Signed and Sealed this
Seventh Day of August, 2012

David J. Kappos
*Director of the United States Patent and Trademark Office*

CERTIFICATE OF CORRECTION (continued)
U.S. Pat. No. 7,782,778 B2

Column 17, line 10 (in Table 2), delete "Psuedocode" and insert -- Pseudocode --.

Column 17, line 42 (in Table 3), delete "Psuedocode" and insert -- Pseudocode --.

Column 17, line 63, delete "1012;" and insert -- 1012, --.

Column 18, line 5 (in Table 4), delete "SRAM" and insert -- SRAM 1050 in response to data frames received from SAN A 1005 --.

Column 18, line 6 (in Table 4), delete "Psuedocode" and insert -- Pseudocode --.

Column 18, line 27, delete "1050 in response to data frames received from SAN A 1005".

Column 18, line 28, delete "TheEgress block" and insert -- The Egress Block --.

Column 18, line 52 (in Table 5), delete "Psuedocode" and insert -- Pseudocode --.

Column 19, line 7 (in Table 5), delete "Psuedocode" and insert -- Pseudocode --.

Column 19, line 38 (in Table 6), delete "Psuedocode" and insert -- Pseudocode --.

Column 20, line 5 (in Table 6), delete "Psuedocode" and insert -- Pseudocode --.

Column 20, line 45 (in Table 7), delete "Psuedocode" and insert -- Pseudocode --.

Column 21, line 31, delete "6.711 e7" and insert -- 6.711e7 --.